(12) United States Patent
Patil et al.

(10) Patent No.: US 12,727,593 B2
(45) Date of Patent: Sep. 8, 2026

(54) SYSTEM WITH MASTER-SLAVE ARCHITECTURE FOR AGRICULTURAL APPLICATIONS AND METHOD FOR OPERATING THE SYSTEM

(71) Applicant: Tartan Aerial Sense Tech Private Limited, Bangalore (IN)

(72) Inventors: Aditya Sunil Patil, Bellary (IN); Santosh C. Lakkumane, Kumta (IN); Prakash Mathews Pothen, Thiruvalla (IN)

(73) Assignee: Tartan Aerial Sense Tech Private Limited, Bangalore (IN)

( * ) Notice: Subject to any disclaimer, the term of this patent is extended or adjusted under 35 U.S.C. 154(b) by 440 days.

(21) Appl. No.: 18/394,937

(22) Filed: Dec. 22, 2023

(65) Prior Publication Data

US 2024/0206453 A1 Jun. 27, 2024

(30) Foreign Application Priority Data

Dec. 26, 2022 (IN) ............................. 202241075497

(51) Int. Cl.
*A01M 7/00* (2006.01)
*A01M 21/02* (2006.01)
*H04N 23/661* (2023.01)

(52) U.S. Cl.
CPC ........ *A01M 7/0089* (2013.01); *A01M 7/0042* (2013.01); *A01M 21/02* (2013.01); *H04N 23/662* (2023.01)

(58) Field of Classification Search
CPC .. A01M 7/0089; A01M 7/0042; A01M 21/02; H04N 23/662
See application file for complete search history.

(56) References Cited

U.S. PATENT DOCUMENTS 10,255,670 B1 * 4/2019 Wu ........................ H04N 7/183

FOREIGN PATENT DOCUMENTS

CN 106719546 A * 5/2017 .......... A01M 7/0089
CN 210642121 U * 6/2020

OTHER PUBLICATIONS

English Translation of CN-106719546-A, (Apr. 24, 2026).*
English Translation of CN-210642121-U, (Apr. 24, 2026).*

* cited by examiner

*Primary Examiner* — Wade Miles
*Assistant Examiner* — James Brian Chin
(74) *Attorney, Agent, or Firm* — Barta Jones. PLLC

(57) ABSTRACT

A system mounted in a vehicle for agricultural applications includes a master apparatus and one or more slave apparatus. The master apparatus includes a central image-capture device and a master control device that is configured to acquire first geospatial location data including a first precision value and obtain location correction data from an external device. The master control device further generates a second geospatial location data including a second precision value by applying the location correction data to the first geospatial location data. The master control device further communicates the generated second geospatial location data to the slave control device. Thereafter, each slave control device is configured to determine one or more time slots in advance to automatically perform a determined action when the vehicle is in motion.

20 Claims, 12 Drawing Sheets

Acquiring, by master control device, first geospatial location data having first precision value from inbuilt sensor of master control device 702

Obtaining, by master control device, location correction data from external device installed at fixed location within communication range of master control device 704

Generating, by master control device, second geospatial location data having second precision value by applying location correction data to first geospatial location data, wherein second precision value is higher than first precision value 706

Communicating, by master control device, generated second geospatial location data to each slave control device of one or more slave apparatus 708

Determining, by each slave control device, one or more time slots in advance to automatically perform farm upkeep action when vehicle is in motion based on corresponding set of slave image-capture devices and second geospatial location data received from master control device, wherein each slave control device is communicatively coupled to corresponding set of slave image-capture devices 710

FIG. 7A

Determining, by the master control device, one or more time slots in advance to perform the determined action in advance based on the central image-capture device 712

Controlling, by the master control device along with the slave control device of the one or more slave apparatus, a set of electronically controlled sprayer nozzles to direct a continuous release of a chemical specifically over one or more crop regions encompassing one or more crop plants for the determined time slot when the determined action is a perceptive spot spraying of the chemical 714

Dynamically updating, by the master control device, the one or more crop regions encompassing the one or more crop plants based on a change in a front buffer and a rear buffer set for the central image-capture device 716

Dynamically updating, by each slave device of the one or more slave apparatus, the one or more crop regions encompassing the one or more crop plants based on a change in a front buffer and a rear buffer associated with each slave image-capture device of the corresponding set of slave image-capture devices 718

Controlling one or more pairs of weeding blades such that weeding blades of each pair of weeding blades are moved close to each other to uproot weeds between two crop plants and automatically moved apart from each other for the determined time slot ahead of a position of each crop plant in the agricultural field to bypass each crop plant as well as to uproot the weeds around each crop plant when the determined action is a perceptive weeds uprooting action 720

FIG. 7B

SYSTEM WITH MASTER-SLAVE ARCHITECTURE FOR AGRICULTURAL APPLICATIONS AND METHOD FOR OPERATING THE SYSTEM

CROSS-REFERENCE TO RELATED APPLICATIONS/INCORPORATION BY REFERENCE

This patent application makes reference to, claims the benefit of, and claims priority to an Indian Patent Application No. 202241075497 filed on Dec. 26, 2022, which is incorporated herein by reference in its entirely, and for which priority is hereby claimed under the Paris Convention and 35 U.S.C. 119 and all other applicable law.

TECHNICAL FIELD

The present disclosure relates generally to the field of agricultural machines and systems; and more specifically, to a master-slave system with master-slave architecture for agricultural application and a method for operating the system having improved operating efficiency, for example, reduced power consumption, significantly improved operating time, improved situational-awareness and accuracy achieved in operations in real-world conditions.

BACKGROUND

With the rapid advancement of machines, agricultural implements, special-purpose vehicles, and vehicle mounted apparatus, productivity in agricultural operations have increased. However, existing agricultural machinery are very complex in nature, where a particular system, apparatus, or machine works only when it is from a same manufacturer. In other words, one system of one manufacturer is incompatible with another system of another manufacturer, which binds a user to use costly machineries and agricultural implements of one specific-manufacturer. For example, it is sometimes simply not possible or very technically challenging to use a conventional apparatus or machine of one manufacturer with another apparatus of another manufacturer as crosstalk among different electronics and mechatronics systems is generally restricted or severely limited in use. Furthermore, existing devices are known to use global positioning system (GPS) for location coordinates, but it is well-known that civilian use of GPS has an error-range of 1-10 meters, and sometimes more depending on signal reception on a particular area.

There are many other technical problems with conventional systems and methods that require on-field operations in an agricultural field. In a first example, conventional systems require row identification, where row-based processing forms an indispensable component of conventional systems. Conventional systems fail when proper rows are not demarcated in the agricultural field. In a second example, there is a problem of over-engineering, i.e., too many sensor units, too much processing, and very complex machines. In such a situation, the chances of errors are high due to multiple failure points and at the same time makes such machines very costly, power intensive, and processing intensive, which are not suited for many sub-urban, urban, or rural farming conditions and needs. For instance, some existing systems use chlorophyll sensors or detectors to supplement or corroborate the visible-spectrum image sensors. However, still fail in accurately distinguish between two green looking objects, such as crops and weeds.

In a third example, other camera-based systems are known to aid in spot spraying operation of chemicals by an agricultural machine. However, uneven land area of the agricultural field combined with uncertainty in surrounding environmental conditions while capturing images of agricultural fields are found to severely and adversely impact the accuracy and effectiveness of existing systems that are related to, for example, automated, precision, or spot spraying of chemicals, like herbicides, insecticides, or nutrients. The existing systems either fail or accuracy is severely impacted in such conditions, which is not desirable. This causes the conventional machines, systems, and methods to misbehave or causes errors to differentiate between two green looking objects (e.g., crop plants and weeds). In a fourth example, there is another technical problem of a system failure related to a surrounding environment-affected misidentification or deception caused due to sudden movement of air, a part occlusion of a crop plant, and the like. This causes the system to fail to properly detect and track the crop plants when a camera-aided machine is in operation in real-world conditions.

Further limitations and disadvantages of conventional and traditional approaches will become apparent to one of skill in the art through comparison of such systems with some aspects of the present disclosure as set forth in the remainder of the present application with reference to the drawings.

SUMMARY

The present disclosure provides a system with master-slave architecture for agricultural applications and a method for operating the system. The present disclosure provides a solution to the existing problem of row identification required in existing camera-based systems, incompatibility with other systems or other manufacturer's agricultural implements, high complexity, and power intensiveness of existing systems. Moreover, the existing systems either fail or accuracy is severely impacted when images are captured in a changing surrounding environmental condition, causing erroneous processing and unwanted wastage, or misfiring of chemical, for example, during a spray session. An aim of the present disclosure is to provide a solution that overcomes at least partially the problems encountered in prior art and provide an improved system with master-slave architecture for agricultural application and an improved method for operating the system.

These and other advantages, aspects, and novel features of the present disclosure, as well as details of an illustrated embodiment thereof, will be more fully understood from the following description and drawings.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3B is a block diagram that illustrates various exemplary components of a master control device, in accordance with an embodiment of the present disclosure;

FIG. 3C is a block diagram that illustrates various exemplary components of a slave control device, in accordance with an embodiment of the present disclosure;

FIGS. 7A and 7B collectively is a flowchart of a method for controlled and perceptive chemical spraying on an agricultural field, in accordance with an embodiment of the present disclosure; and

DETAILED DESCRIPTION OF THE DISCLOSURE

Figure 1A:
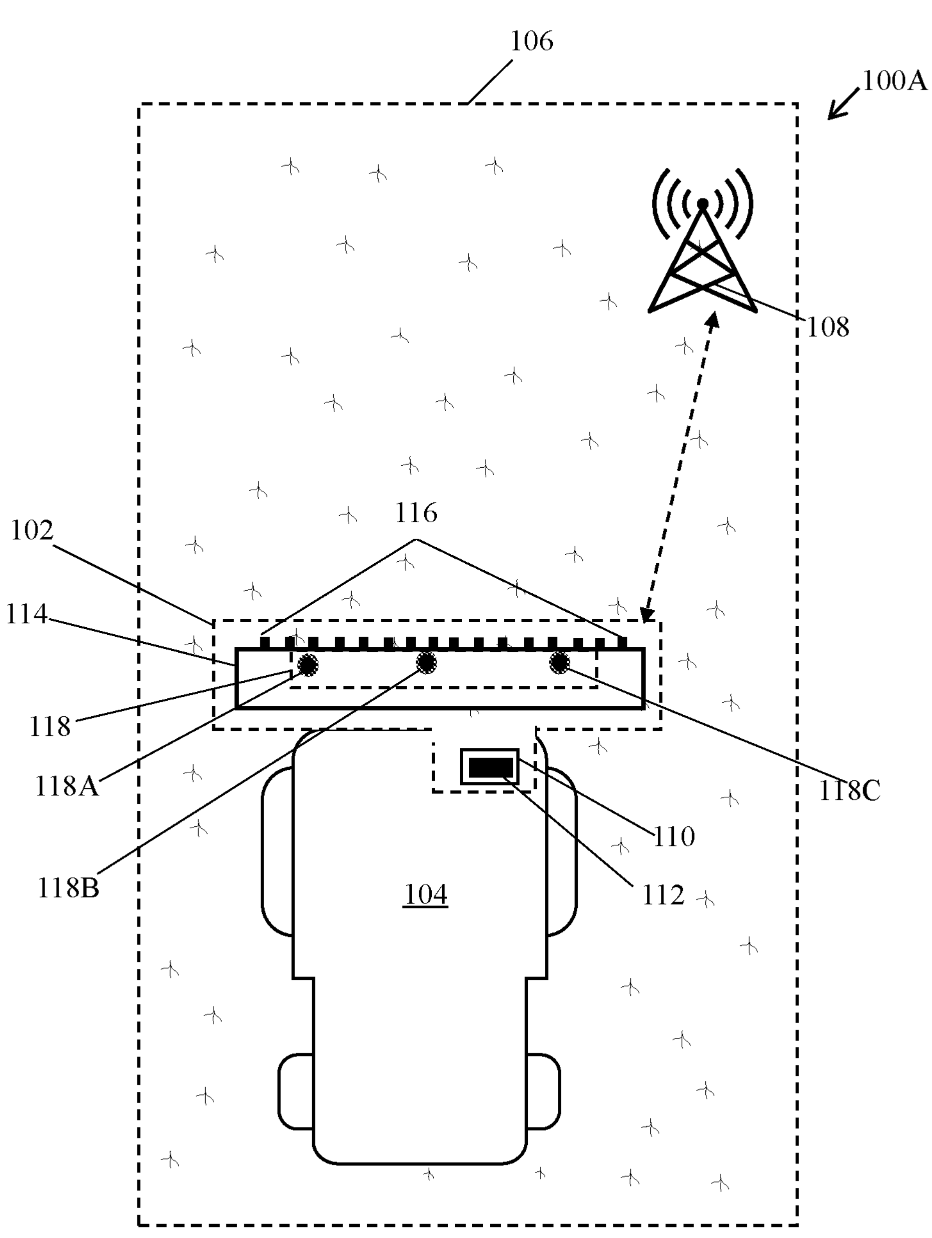
FIG. 1A is a diagram illustrating a system mounted in a vehicle with perceptive ability to perform a defined action on an agricultural field, in accordance with an embodiment of the present disclosure.

Certain embodiments of the disclosure may be found in a system with master-slave architecture for agricultural applications and a method for operating the system. In one aspect, the present disclosure provides a system mounted in a vehicle for agricultural applications, comprising a master apparatus, and one or more slave apparatus. The master apparatus comprises a central image-capture device and a master control device communicatively coupled to the central image-capture device. Moreover, each slave apparatus comprises a set of slave image-capture devices and a slave control device communicatively coupled to the corresponding set of slave image-capture devices. Furthermore, the master control device is configured to acquire a first geospatial location data having a first precision value from an inbuilt sensor of the master control device and obtain location correction data from an external device installed at a fixed location within a communication range of the master control device. The master control device is configured to generate second geospatial location data having a second precision value by applying the location correction data to the first geospatial location data, wherein the second precision value is higher than the first precision value and communicates the generated second geospatial location data to the slave control device. Furthermore, each slave control device is configured to determine one or more time slots in advance to automatically perform a determined action when the vehicle is in motion based on the corresponding set of slave image-capture devices and the second geospatial location data received from the master control device.

The system in the present disclosure is technically advanced in terms of its perceptive ability and is intelligent enough to adapt to uneven agricultural land, is astutely perceptive to real-time changes in the surrounding environmental conditions, and not dependent on any row-identification. For example, in conventional systems, if crops are planted in proper rows and columns in an agricultural field, then only camera-assisted or camera-aided machines can function in real-world conditions. Unlike the conventional systems, the disclosed system of the present invention does not need any prior plantation format to be followed. The master control device of the system is configured to control the central image-capture device. Moreover, the master control device is configured to collect position system (e.g., global satellite-based positioning system, such as GPS) data as well as obtain location correction data from the external device through a long-range and low-power radio (LoRa) to achieve precise geo-localization with minimal infrastructure requirements. The location correction data from the external device is applied on the first geospatial location to generate the second geospatial location data including the second precision value (i.e., highly accurate as compared to initial location derived from GPS, for example). Furthermore, the first geospatial location and the first precision value are used to determine the speed of the vehicle (i.e., at what speed the vehicle is moving). In addition, the second geospatial location data provides a significantly improved positional accuracy of the master control device, i.e., provides a centimetre (cm) level accuracy of position of the master control device when the vehicle is in motion. In addition, the second geospatial location data and the second precision value are used to determine an improved odometry value (e.g., at the centimetre level), which corresponds to a corrected distance value, such as the distance moved by the vehicle relative to the starting location of the vehicle. Therefore, the generated second geospatial location data is used to improve the perceptive capability of the system and to identify the correct time slots and at the correct intended areas or spots where a defined action is to be taken. In addition, every communication to each slave control device is transmitted through the master control device, which in turn provides an economic significance and benefits as additional circuitry is not required in each slave control device. Beneficially as compared to conventional approaches, each slave control device and master control device are technically advanced to accurately perform the defined action without depending on any demarcation of rows and columns in the agricultural field and has the ability to differentiate between two green looking objects (e.g., crop plants and weeds) by effectively handling the problem of surrounding environment-affected misidentification or deception caused due to the temporal change of shape of leaves due to a sudden movement of air, a part occlusion of a crop plant, temporary leaves drooping problem, and the like.

In an implementation, the master control device is further configured to determine the one or more time slots in advance to perform the determined action in advance based on the central image-capture device. By virtue of determining the one or more time slots in advance, the master control device perform the determined action without any system failure while reducing the power consumption at the time of action.

In a further implementation, each slave control device of the one or more one or more slave apparatus is further configured to acquire a plurality of different sequence of images corresponding to different field-of-views (FOVs) from the corresponding set of slave image-capture devices. The plurality of different sequence of images are used to distinguish between the crop plants and weeds irrespective of the surrounding environment-affected misidentification or deception problem. This is because in the training phase of an artificial intelligence model, the system takes into account leaves drooping, a temporary change in shapes of leaves, colour change of leaves, possibility of occlusions, etc, in order to make the system fail-safe.

In a further implementation, the master control device along with the slave control device of the one or more slave apparatus are configured to control a set of electronically controlled sprayer nozzles to direct a continuous release of a chemical specifically over one or more crop regions encompassing one or more crop plants for the determined time slot when the determined action is a perceptive spot spraying of the chemical. In this implementation, as the determined time slot is accurate, the whole crop plant is covered by the continuous release of the chemical specifically over one or more crop regions encompassing one or more crop plants. Moreover, an overall cost of spraying is also reduced as compared to existing machines that uses camera-aided systems for spraying.

In a further implementation, the master control device is configured to dynamically update the one or more crop regions encompassing the one or more crop plants based on a change in a front buffer and a rear buffer set for the central image-capture device. The front buffer and the rear buffer for the central image-capture device are used by the master control device to automatically expand or adjust the one or more crop regions. In other words, if a user wants to cover not only the crop plant but also some more area around the crop plant, to be very sure of spray in a large field. This capability is provided by this technical implementation and use of front buffer and rear buffer when the vehicle is in motion.

In a further implementation, each slave control device of the one or more slave apparatus is configured to dynamically update the one or more crop regions encompassing the one or more crop plants based on a change in a front buffer and a rear buffer associated with each slave image-capture device of the corresponding set of slave image-capture devices. In this implementation, each slave control device is configured to determine one or more regions in the agricultural field where to spray the chemical based on the executed mapping of pixel data, a defined confidence threshold, the front buffer, and the rear buffer associated with each slave image-capture device of the corresponding set of slave image-capture devices. This combination of features (i.e., the executed mapping of pixel data, a defined confidence threshold, the front buffer, and the rear buffer associated with each slave image-capture device) surprisingly further makes the system more accurate even in adverse real-world and practical situations to solve the surrounding environment-affected misidentification or deception problem and accommodate any new use case requested by a user.

In a further implementation, the master control device along with the slave control device of the one or more slave apparatus are configured to control one or more pairs of weeding blades such that weeding blades of each pair of weeding blades are moved close to each other to uproot weeds between two crop plants and automatically moved apart from each other for the determined time slot ahead of a position of each crop plant in the agricultural field to bypass each crop plant as well as to uproot the weeds around each crop plant when the determined action is a perceptive weeds uprooting action. The master control device along with each slave control device of the system are used for selective uprooting the weeds only, without causing any harm to the crop plants.

In a further implementation, the master control device comprises a first printed circuit board (PCB) that comprises a first microcontroller for a first level of processing that comprises booting different components of the first PCB, switching one of one or more buffer circuits associated with the central image-capture device, control a sequence of power supply to the different components of the PCB.

In a further implementation, the first PCB of the master control device further comprises a camera connection port to connect to the central image-capture device, a graphics processing unit (GPU) to process a sequence of images captured by the central image-capture device, a power connector to receive a mains power supply from a battery of the vehicle, and a direct current (DC)-to-DC converter to supply a filtered current to the different components of the first PCB from the mains power supply to reduce maintenance and improve a total operating-life of the system.

The GPU is configured to use a deep learning model to process the sequence of images, such as to resize the size of the sequence of images, which is used for the distinguish between the crop plants and the weeds. In an example, if the images captured by any of the image-capture device takes into account drooping of leaves, a temporary change in shape of leaves due to movement of air, a part occlusion of leaves due to high density of weeds, etc. This causes the system to accurately identify the crop plants and distinguish from the weeds, which is further used to automatically change an extent of an action area of the determined action by the implement attached to the vehicle.

In a further implementation, the first PCB of the master control device further comprises a wired local area network connector configured to connect to each slave device of the one or more slave apparatus, a first antenna to obtain the location correction data from the external device via a low-power wireless wide area network (LPWAN), and a second antenna configured to establish a remote connectivity with a server via a cellular network. The second antenna is used by the master control device to collects GPS data through the remote connectivity with the server via the cellular network. Moreover, the first antenna is used to obtain the location correction data from the external device. Thereafter, the master control device is configured to correct the GPS data using location correction data received from the external device through the LPWAN, which is used to generate a second geospatial location data that includes a second precision value.

In a further implementation, the master control device further comprises a second PCB that comprises a first set of solenoid controls. The first set of solenoid controls are used activate a specific set of spray valves associated with the identified sprayer nozzles, and simultaneously deactivate another specific set of spray valves associated with the identified sprayer nozzles.

In a further implementation, each slave control device of the one or more slave apparatus comprises a third PCB, wherein the third PCB comprises a second microcontroller for a first level of processing that comprises booting different components of the third PCB and switching one of one or more buffer circuits associated with each slave image-capture device of the corresponding set of slave image-capture devices.

In a further implementation, the third PCB of each slave control device further comprises a plurality of camera connection ports to connect to the corresponding set of slave image-capture devices, a graphics processing unit (GPU) comprises to process a different sequence of images captured by each slave image-capture device of the corresponding set of slave image-capture devices, a power connector to receive a power supply via the master control device, and a wired local area network connector configured to connect to the master control device.

In another aspect, the present disclosure provides a method for operating a system mounted in a vehicle for agricultural applications, the method comprising acquiring, by a master control device, first geospatial location data having a first precision value from an inbuilt sensor of the master control device. The method further comprises, obtaining, by the master control device, location correction data from an external device installed at a fixed location within a communication range of the master control device. The method further comprises, generating, by the master control device, second geospatial location data having a second precision value by applying the location correction data to the first geospatial location data, wherein the second precision value is higher than the first precision value. The method further comprises, communicating, by the master control device, the generated second geospatial location data to each slave control device of one or more slave apparatus. The method further comprises, determining, by each slave control device, one or more time slots in advance to automatically perform a determined action when the vehicle is in motion based on a corresponding set of slave image-capture devices and the second geospatial location data received from the master control device, wherein each slave control device is communicatively coupled to the corresponding set of slave image-capture devices. The method achieves all the advantages and technical effects of the system of the present disclosure.

It is to be appreciated that all the aforementioned implementations can be combined. It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims. Although some modes of carrying out the present disclosure have been disclosed, those skilled in the art would recognize that other embodiments for carrying out or practicing the present disclosure are also possible. The following detailed description illustrates embodiments of the present disclosure and ways in which they can be implemented.

FIG. 1A is a diagram illustrating a system mounted in a vehicle with perceptive ability to perform a defined action on an agricultural field, in accordance with an embodiment of the present disclosure. With reference to FIG. 1A, there is shown a diagram 100 that comprises a system 102 mounted in a vehicle 104 with perceptive ability to perform a defined action on an agricultural field 106. The system 102 includes a boom arrangement 114, which includes a predefined number of electronically controllable sprayer nozzles 116 and a plurality of image-capture devices 118 (such as a first image-capture device 118A, a second image-capture device 118B, and a third image-capture device 118C). There is further shown an external device 108 that is communicatively coupled to the system 102. In an implementation, the system 102 may further include a display device 110 for a user of the vehicle 104. A custom application 112 may be installed in the display device 110.

The system 102 is mounted in the vehicle 104 to provide the vehicle with perceptive ability to perform a defined action (e.g., a perceptive chemical spraying) on the agricultural field 106. The system 102 includes the boom arrangement 114 that includes the predefined number of electronically controllable sprayer nozzles 116 and the plurality of image-capture devices 118 configured to capture a plurality of field-of-views (FOVs) of a plurality of defined areas of the agricultural field 106. The system 102 further includes one or more hardware processors (shown in FIG. 2) that are configured to obtain a plurality of images corresponding to the plurality of FOVs from the plurality of image-capture devices 118. The one or more hardware processors are further configured to receive geospatial location correction data from the external device 108 that is placed at a fixed location in the agricultural field 106 and geospatial location coordinates associated with the boom arrangement 114 mounted on the vehicle 104. The geospatial location correction data may be RTK correction data used to correct global navigation satellite system, such as GPS errors while the vehicle 104 is in motion. The use of the geospatial location correction data (e.g., real-time kinematic positioning (RTK) correction data) from the external device 108 (e.g., an RTK base station) that is applied on the geospatial location coordinates obtained by a geospatial sensor provided in the boom arrangement, significantly improves the positional accuracy of the boom arrangement 114 that is provides a centimetre (cm) level accuracy of position of the boom arrangement when the vehicle 104 is in motion. This improves the accuracy to determine a distance and position of an object-of-interest, such as a crop plant, with respect to the position of the plurality of image-capture devices 118 as such devices are also mounted on the boom arrangement 114. In the conventional systems, typically a global positioning system (GPS) sensor inbuilt in a vehicle is employed for calculation of time to spray chemicals, which reduces the location accuracy.

The one or more hardware processors are further configured to execute mapping of pixel data of weeds or a crop plant in an image to distance information from a reference position of the boom arrangement 114 when the vehicle 104 is in motion. Unlike conventional systems, in the present disclosure, as the predefined number of electronically controllable sprayer nozzles 116 as well as the plurality of image-capture devices 118 are mounted in the boom arrangement 114 and cm level accurate spatial position of the boom arrangement is derived, the mapping of pixel data of weeds or the crop plant to distance information from the reference position of the boom arrangement 114 when the vehicle 104 is in motion, is also very accurate. Thereafter, the one or more hardware processors are further configured to cause a specific set of electronically controllable sprayer nozzles from amongst the predefined number of electronically controllable sprayer nozzles 116 to operate based on a defined confidence threshold and the executed mapping of pixel data. Moreover, the defined confidence threshold is indicative of a detection sensitivity of the crop plant. The use of the defined confidence threshold significantly improves the perceptive capability of the system 102 such that the spraying of chemicals is achieved with improved accuracy and precision for the correct time slots, at correct intended areas or spots and only when required with correct amount of spray and correct selection of a type of chemical irrespective of any change in the surrounding environmental conditions while capturing images of agricultural field 106. For example, an increase or a decrease in the defined confidence threshold dynamically changes the detection sensitivity of the crop plant increasing the perceptive capability of the system 102 making the system 102 fail-safe. Moreover, the system 102 is perceptive and intelligent enough to adapt to uneven agricultural land, is astutely perceptive to real-time changes in the surrounding environmental conditions, and not dependent on any row-identification.

Figure 1B:
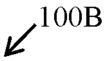
FIG. 1B is a diagram illustrating a boom arrangement mounted on a vehicle, in accordance with an embodiment of the present disclosure.
Figure 1B:
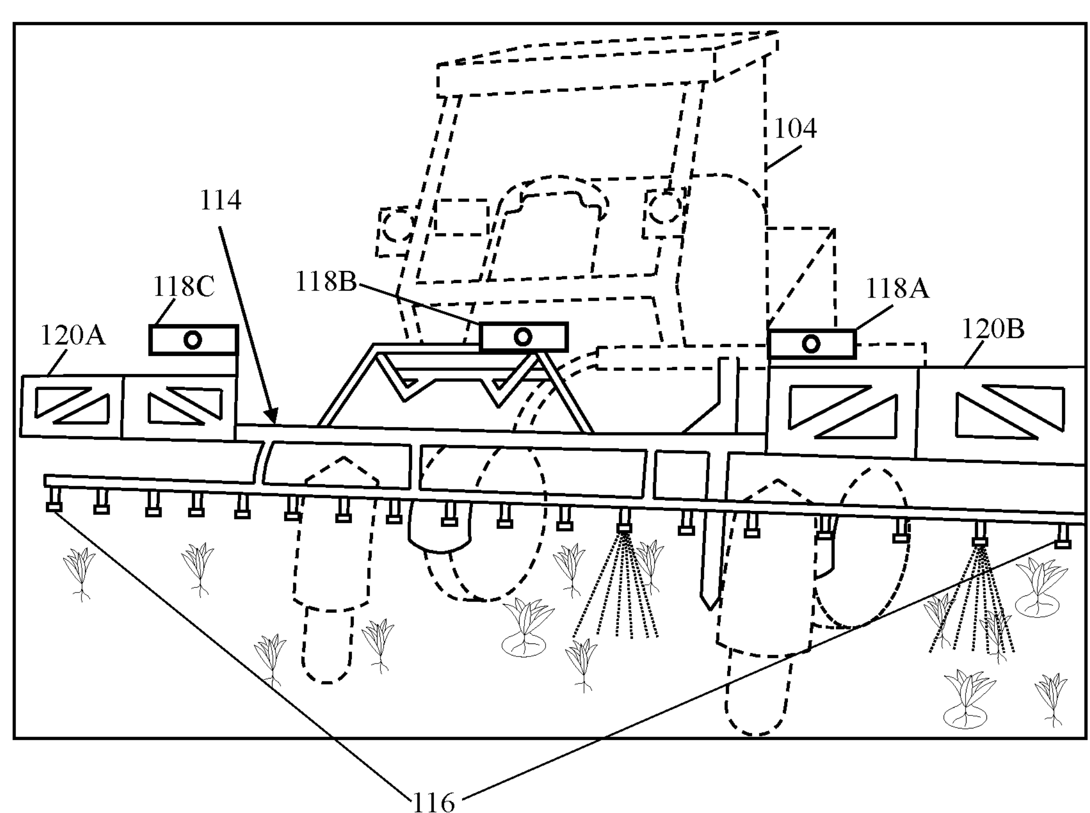

FIG. 1B is a diagram illustrating the boom arrangement mounted on a vehicle, in accordance with an embodiment of the present disclosure. FIG. 1B is described in conjunction with elements of FIG. 1A. With reference to FIG. 1B, there is shown the boom arrangement 114 mounted on the vehicle 104.

The boom arrangement 114 is removably mounted on the vehicle 104. The boom arrangement 114 includes one or more elongated booms that are interconnected through a single frame. The boom arrangement 114 comprises the predefined number of electronically controllable sprayer nozzles 116 and the plurality of image-capture devices 118. The predefined number of electronically controllable sprayer nozzles 116 are configured to spray a chemical on either a plurality of crop plants or weeds perceptively in a controlled manner, depending on an application scenario.

Each of the plurality of image-capture devices 118 may include suitable logic, circuitry, and/or interfaces that is configured to capture a plurality of field-of-views (FOVs) of a plurality of defined areas of the agricultural field 106 (of FIG. 1A). In an implementation, the plurality of image-capture devices 118 are installed on the vehicle 104 (of FIG. 1A) and may include a left-side camera (e.g., a RGB camera), a right-side camera and a central camera. Examples of each of the plurality of image-capture devices 118 may include but not limited to, a RGB camera, a high dynamic range (HDR) camera, and the like. In an example, the boom arrangement 114 include one or more casings, such as a first box 120A, and a second box 120B that are used to store and protect the circuitry as well controller other electronics components (e.g., a controller) that are required for the functioning of the plurality of image-capture devices 118. Moreover, the plurality of image-capture devices 118 are arranged in a same plane in downward (i.e., lookdown) position. Similarly, the predefined number of electronically controllable sprayer nozzles 116 are also arranged in a same plane in the boom arrangement 114. In addition, each camera device from the plurality of image-capture devices 118 is arranged above the predefined number of electronically controllable sprayer nozzles 116 at a defined height. The defined height, i.e., a distance between the plane on which the plurality of image-capture devices 118 are arranged and the plane on which the predefined number of electronically controllable sprayer nozzles 116 are arranged is beneficially used by the one or more hardware processors (FIG. 2) to determine in advance precisely when to activate, which nozzles to activate, and a current distance between the boom arrangement and a plurality of crop plants that are to be sprayed when such crop plants reach almost underneath the the predefined number of electronically controllable sprayer nozzles 116. A FOV may be set, for example, of 1 meter, to acquire higher resolution and detailing in the captured images. Therefore, such arrangement of the plurality of image-capture devices 118 provides enough buffer time to the one or more hardware processors to process the images, for example, for crop detection, crop tracking, distinguishing from weeds, and/or for determination of the correct defined confidence threshold. Moreover, such buffer time is further used by the one or more processors to activate a specific set of electronically controllable sprayer nozzles at a specific time and to deactivate another set of electronically controllable sprayer nozzles in a proactive manner. In other words, such buffer time can be used by the one or more processors to determine a desired time in advance, such as to activate or deactivate the specific set of electronically controllable sprayer nozzles at a desired time. Moreover, the specific set of electronically controllable sprayer nozzles 116 are activated to spray at only intended areas or spots and only when required with correct amount of spray and correct selection of a type of chemical irrespective of any change in the surrounding environmental conditions while capturing images of the agricultural field 106 (of FIG. 1A).

Figure 1C:
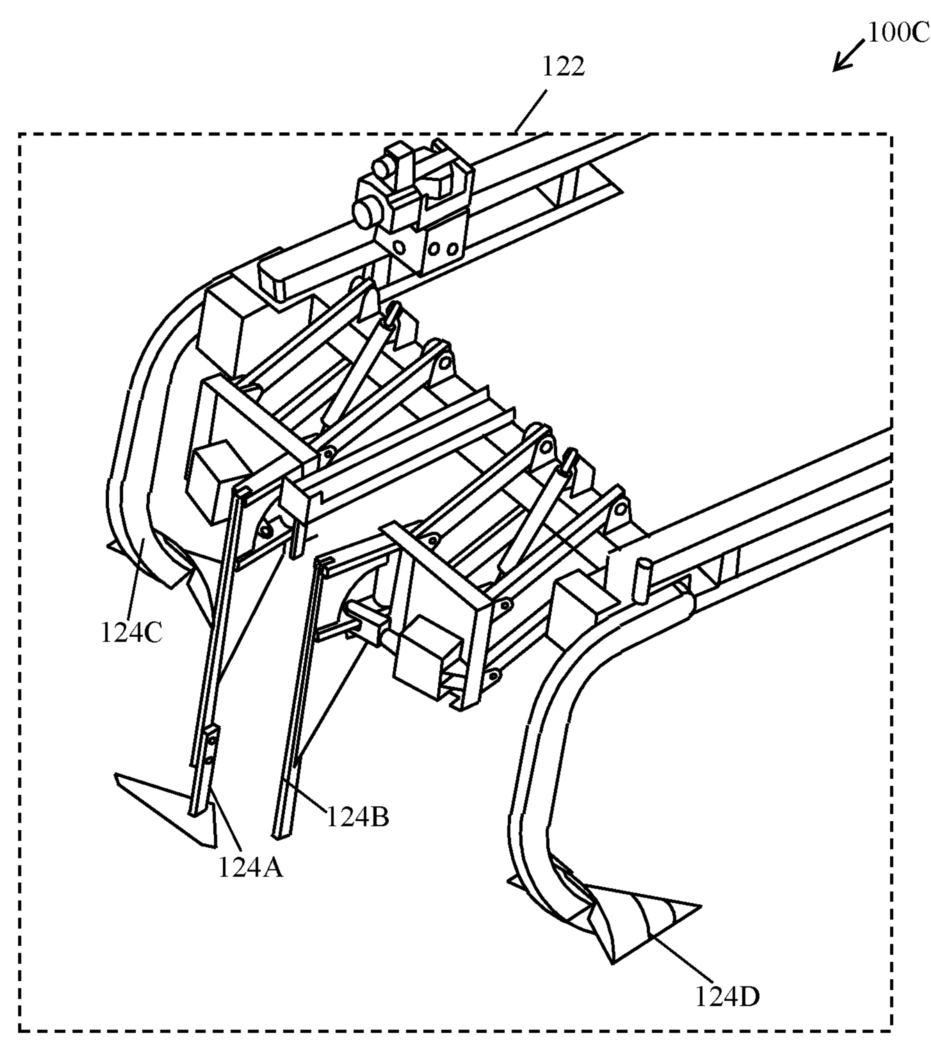
FIG. 1C is a diagram illustrating a boom arrangement for a vehicle, in accordance with another embodiment of the present disclosure.

FIG. 1C is a diagram illustrating a boom arrangement for a vehicle, in accordance with an embodiment of the present disclosure. FIG. 1C is explained in conjunction with elements from FIGS. 1A and 1B. With reference to FIG. 1C, there is shown a diagram 100C illustrating a boom arrangement 122 for a vehicle 104. In an implementation, the boom arrangement 122 includes the one or more pairs of weeding blades, such as a first weeding blade 124A, a second weeding blade 124B, a third weeding blade 124C and a fourth weeding blade 124D. The one or more pairs of weeding blades can be attached with the system 102, such as to be placed in front of the vehicle 104 to uproot the weeds and bypass the crop plant.

Figure 2:
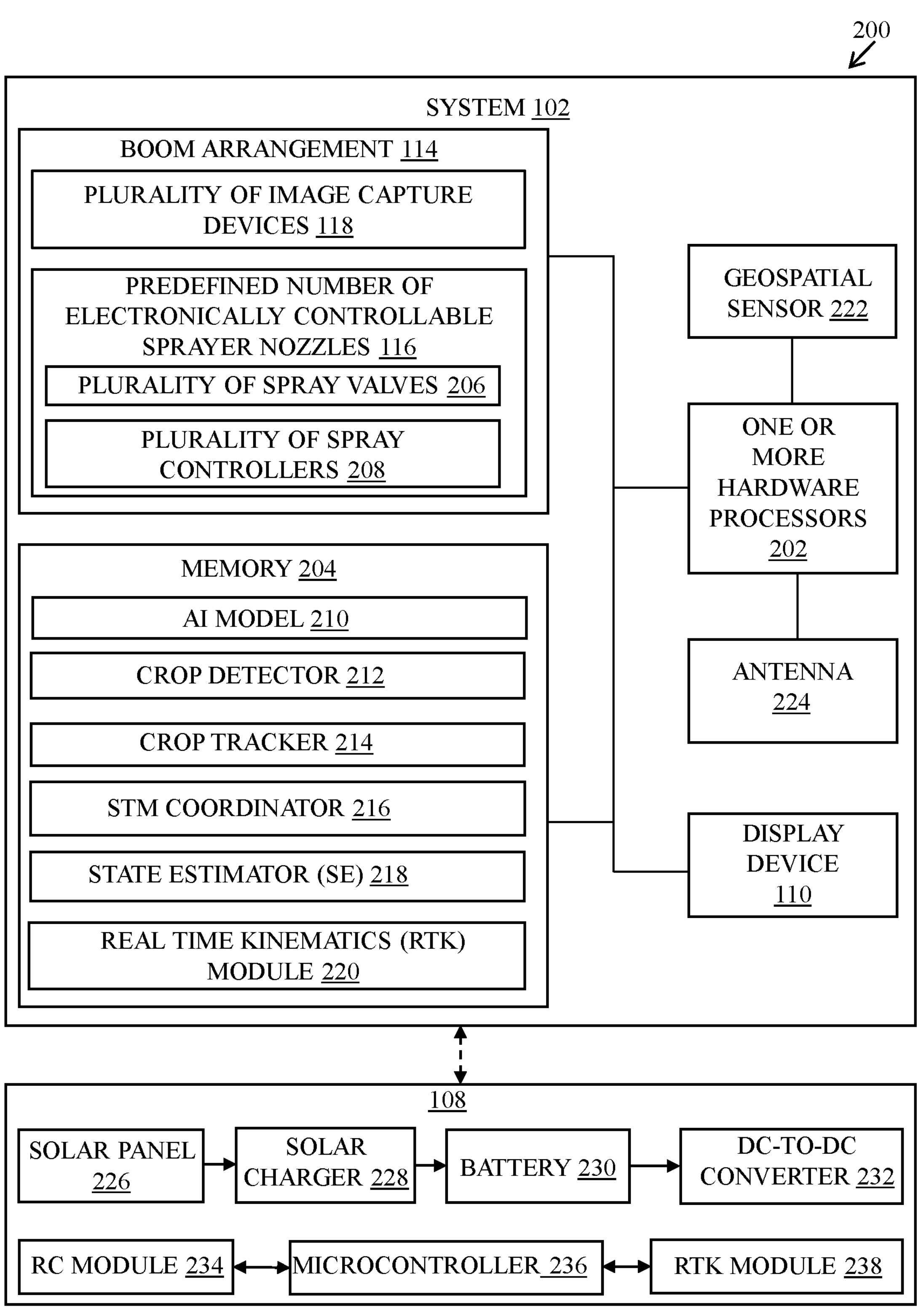
FIG. 2 is a block diagram that illustrates various exemplary components of a system, in accordance with an embodiment of the present disclosure.

FIG. 2 is a block diagram that illustrates various exemplary components of a system, in accordance with an embodiment of the present disclosure. FIG. 2 is described in conjunction with elements of FIGS. 1A and 1B. With reference to FIG. 2, there is shown a block diagram 200 of the system 102 (of FIG. 1A) comprising one or more hardware processors 202 and a memory 204 with an artificial intelligence (AI) model 210.

In an implementation, the one or more hardware processors 202 may include one or more graphics processing units (GPU) and a central processing unit (CPU). Examples of each of the one or more hardware processors 202 may include, but are not limited to an integrated circuit, a co-processor, a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or circuits. Moreover, the one or more hardware processors 202 may refer to one or more individual processors, graphics processing devices, a processing unit that is part of a machine.

The memory 204 may include suitable logic, circuitry, and/or interfaces that is configured to store machine code and/or instructions executable by the one or more hardware processors 202. Examples of implementation of the memory 204 may include, but are not limited to, an Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. The memory 204 may store an operating system, such as a robot operating system (ROS) and/or a computer program product to operate the system 102. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

The AI model 210 enables the plurality of image-capture devices 118 to capture high-quality images of the agricultural field 106 despite of variation in the environmental parameters (i.e., variation in sunlight due to either clouds or rain or shadow of a large object). Moreover, the AI model 210 is pre-trained and enables the system 102 to clearly differentiate between two green looking objects (e.g., crop plants and weeds) and results in a controlled and perceptive spraying of chemicals on the weeds. Alternatively stated, the AI model 210 enhances the accuracy and efficiency of the system 102. In an implementation, the AI model 210 may be stored in the memory 204. In another implementation, the AI model 210 may be disposed outside the memory 204 as a sperate module or circuitry and communicatively coupled to the memory 204.

In operation, the system 102 is mounted in the vehicle 104 for controlled and perceptive chemical spraying on the agricultural field 106. The system 102 comprises the plurality of image-capture devices 118 configured to capture a plurality of field-of-views (FOVs) of a plurality of defined areas of the agricultural field 106. When the vehicle 104 is moving across the agricultural field 106, the system 102 is configured to spray the chemicals on the agricultural field 106, in an intelligent way as well as in a controlled manner. The plurality of image-capture devices 118 enables the system 102 to observe desired crop plants including a type of crop plants as well as the weeds in nearby surroundings (e.g., either in a same row or side rows) of the desired crop plants in the agricultural field 106. The plurality of FOVs of the plurality of defined areas represents different views (e.g., a look-down view in a specified angle, for example, 45 degrees to 90-degree angle) of the areas of the agricultural field 106 that includes the crop plants as well as the weeds. Each of the plurality of image-capture devices 118 captures the plurality of FOVs of the plurality of defined areas of the agricultural field 106 in order to provide one or more images (i.e., a sequence of images) of the crop plants (e.g., cotton plants) and the weeds with high details and information. This further leads to an effective chemical spraying in the agricultural field 106. In an implementation, each of the plurality of image-capture devices 118 may be oriented at a specific angle (e.g., 60°) in order to capture the plurality of defined areas of the agricultural field 106, few metres in forward as well as in downward direction, for example, up to 80-90 cm or up to 1 metre.

The system 102 further comprises the boom arrangement 114 that comprises the predefined number of electronically controllable sprayer nozzles 116. The predefined number of electronically controllable sprayer nozzles 116 are electronically controlled by use of solenoid valves which control the flow (e.g., on, off, pressure and volume) of chemicals through the sprayer nozzles. In an implementation, the predefined number of electronically controllable sprayer nozzles 116 of the boom arrangement 114 may be divided into a first set, a second set and a third set in order to spray chemicals on left side, right side, and in front side of the vehicle 104, respectively, when the vehicle 104 is moving across the agricultural field 106. Moreover, there may be a specific distance (e.g., 25 cm) between the plurality of image-capture devices 118 and the predefined number of electronically controllable sprayer nozzles 116 of the boom arrangement 114. The specific distance can be increased (e.g., increased up to 50 cm) by tilting each of the plurality of image-capture devices 118. The calibration of the specific distance between the plurality of image-capture devices 118 and the predefined number of electronically controllable sprayer nozzles 116 of the boom arrangement 114 provides a certain time for image processing and switch on the sprayer nozzles. The predefined number of electronically controllable sprayer nozzles 116 may be placed below the plurality of image-capture devices 118 in order to reduce delay and less time will be consumed in spraying the chemicals. In conventional agricultural systems, it is required to tilt a boom, rotate the boom, retract or fold up a part of the boom, when in operation etc. In contrast to the conventional agricultural systems, there is no such requirement in the boom arrangement 114 of the system 102. The predefined number of electronically controllable sprayer nozzles 116 further includes a plurality of spray valves 206 and a plurality of spray controllers 208 (e.g., a solenoid). Moreover, each spray valve from the plurality of spray valves 206 is attached to a corresponding sprayer nozzle of the predefined number of sprayer nozzles. Further, the one or more hardware processors 202 are configured to send an instruction (e.g., an electrical signal) at a first time instant to at least one spray controller (e.g., a solenoid) from the plurality of spray controllers 208 to activate or deactivate a specific set of spray valves associated with the identified sprayer nozzles.

The system 102 further comprises the one or more hardware processors 202 configured to obtain a plurality of images corresponding to the plurality of FOVs from the plurality of image-capture devices 118. In an implementation, the plurality of images captured by the plurality of image-capture devices 118 may include one or more images of the agricultural field 106 captured in different environmental conditions, such as a few images are captured in daylight, a few images are captured in evening time, and few are in night-time. Moreover, the plurality of images also includes one or more images captured during cloudy or rainy environment. In an implementation, the plurality of images captured by the plurality of image-capture devices 118 are stored in the memory 204. In an example, the plurality of images are further processed by a crop detector 212, and a crop tracker 214. The crop detector 212 is configured to detect a crop plant, using the AI model 210 which further leads to more accurate differentiation between crop plants and weeds in different environmental conditions and enables the boom arrangement 114 of the system 102 to perform an efficient and effective chemical spraying in the agricultural field 106. Moreover, the crop tracker 214 is also configured to track location of each crop from the captured plurality of images. In an example, the crop detector 212 and the crop tracker 214 can be implemented in a hardware circuitry. In another example, the crop detector 212 and the crop tracker 214 may be implemented as functions or logic stored in the memory 204.

In an implementation, the memory 204 further includes a STM coordinator 216, a state estimator (SE) 218, and a real time kinematics (RTK) module 220. In an example, each of the STM coordinator 216, SE 218, and the RTK module can be implemented in a hardware circuitry or logic. The STM coordinator 216 is configured to coordinate between the crop detector 212, the crop tracker 214, and the AI model 210 to process the captured plurality of images. Moreover, the SE 218 works in coordination with the RTK module 220 that is configured to process positioning details of the crop plants and weeds from the captured images with improved accuracy. In an example, the SE 218 is configured to receive data related to position of the crop plants and the weeds from the RTK module 220. In addition, the SE 218 is configured to receive freewheel odometry values from the vehicle 104 and provide a fused odometry output that is published in the memory 204 and used by the crop tracker 214 to track positions of the crop plants and weeds.

The one or more hardware processors 202 are further configured to receive geospatial location correction data from the external device 108 placed at a fixed location in the agricultural field 106 and geospatial location coordinates associated with the boom arrangement 114 mounted on the vehicle 104. In an example, the geospatial location coordinates associated with the boom arrangement 114 are obtained based on a geospatial sensor 222 arranged in the boom arrangement, for example, on a printed circuit board (PCB) where the one or more hardware processors 202 are disposed. In an implementation, the external device 108 may also be referred to as a real-time kinematics global positioning system (RTKGPS) module. The external device 108 is configured to provide the geospatial location correction data that means exact location of the vehicle 104 with error correction data in the agricultural field 106 when the vehicle 104 is moving at a specific range of speed across the agricultural field 106. Moreover, the external device 108 provides the geospatial location coordinates of the boom arrangement 114 that is mounted on the vehicle 104. In conventional agricultural systems, a GPS module is located inside a vehicle which provides location data of the vehicle. It is observed during experimentation that by virtue of locating the GPS module inside the vehicle, there is error in location accuracy of the vehicle. In contrast to the conventional agricultural systems, the external device 108 provides not only the exact location but also the error correction data. Additionally, the external device 108 provides geospatial location coordinates of the boom arrangement 114 that mounts the plurality of image-capture devices 118, the predefined number of the electronically controllable nozzles, and the one or more hardware processors 202 so that there is no delay in processing of data with high location accuracy (e.g., accuracy in centimetres, cm) can be achieved.

In an implementation, the external device 108 is setup on a tripod. Moreover, the external device 108 includes a solar panel 226, a solar charger 228, a battery 230, a DC-to-DC converter 232, a Remote Control (RC) module 234, a microcontroller 236, and a RTK module 238. The solar panel 226 is configured to be removably and electrically coupled to the external device 108. The solar panel 226 is further configured to capture solar energy and convert into electric energy, which is further stored in the battery 230 that is electrically coupled to the solar panel 226. Thereafter, the DC-to-DC converter 232 is configured to convert an output of the battery 230 from one voltage level to another, such as to provide a desired voltage to the RC module 234. In an example, the RC module 234 is configured to work with a specified frequency, for example, a 2.4 Giga Hertz or at other frequency value without limiting the scope of the disclosure. In addition, the microcontroller 236 is communicatively coupled with the RC module 234 as well as with the RTK module 238, for example through a universal asynchronous receiver-transmitter (UART). The microcontroller 236 is configured to control the RC module 234 and the RTK module 220, such as to ensure that the system is within a desired from the external device 108. For example, the RC module 234 and the RTK module 220 are configured to receive from an antenna 224 of the system 102.

The one or more hardware processors 202 are further configured to execute mapping of pixel data of weeds or a crop plant in an image to distance information from a reference position of the boom arrangement 114 when the vehicle 104 is in motion. In contrast to conventional agricultural systems, the one or more hardware processors 202 of the system 102 are configured to map pixel level data of weeds or the crop plant in the image to distance information to achieve high accuracy. The distance information signifies the information about the location of weeds and the crop plant from the reference position of the boom arrangement 114 when the vehicle 104 is in motion. That means, how far and in which direction the weeds and the crop plant is located in the agricultural field 106 from the reference position of the boom arrangement 114. Each pixel of the image is mapped to the distance information in millimetres (mm), for example, 1 pixel to 3 mm on real ground, pixel per mm mapping is performed. The mapping of the image depends on a certain threshold value. If the threshold value is different then, mapping of the image will be different. In an implementation, a sub-pixel (or a virtual pixel) of each pixel of the image can be considered to achieve more accuracy.

The one or more hardware processors 202 are further configured to cause a specific set of electronically controllable sprayer nozzles from amongst the predefined number of electronically controllable sprayer nozzles 116 to operate based on a defined confidence threshold and the executed mapping of pixel data, where the defined confidence threshold is indicative of a detection sensitivity of the crop plant. In an implementation, the specific set of electronically controllable sprayer nozzles from amongst the predefined number of electronically controllable sprayer nozzles 116 can be operated either automatically by virtue of the one or more hardware processors 202 or manually, depending on requirement. The operation of the predefined number of electronically controllable sprayer nozzles 116 depends on the defined confidence threshold and the executed mapping of pixel data. The defined confidence threshold is the threshold value of the AI model 210. The defined confidence threshold is adaptive in real time or can be set manually by use of a user interface (UI) of the custom application 112 via the display device 110 (of FIG. 1A). In a case, if the defined confidence threshold increases, the detection sensitivity of the crop plant increases. By virtue of the defined confidence threshold, the system 102 itself detects whether a plant is suffering from a disease, discolouration, or not. The use of the defined confidence threshold is described in further detail, for example, in FIG. 4.

In accordance with an embodiment, the one or more hardware processors 202 are further configured to determine a height of a tallest crop plant from among a plurality of crop plants from a ground plane in the agricultural field 106 and set a boom height from the ground plane based on the determined height of the tallest crop plant. In an example, the system 102 further includes an ultraviolet sensor that is used by the plurality of image-capture devices 118 to determine the height of the crop plant from the ground level. The height of the tallest crop plant from among the plurality of crop plants is determined from the ground plane in the agricultural field 106. The reason of determining the height of the tallest crop plant from among the plurality of crop plants is to include each and every crop with a height lying in a range of smallest to the tallest crop plant. Furthermore, the one or more processors are configured to set the boom height of the boom arrangement 114 from the ground plane based on the determined height of the tallest crop plant.

In accordance with an embodiment, the one or more hardware processors 202 are further configured to determine an upcoming time slot to spray a chemical based on the executed mapping of the pixel data, the defined confidence threshold, and the set boom height. In an implementation, the upcoming time slot may be referred to as a time period (or a time window) which is required to spray the chemical either on the crop plant or on weeds based on the executed mapping of the pixel data, the defined confidence threshold, and the set boom height. For example, 500 to 800 milliseconds (msec) may be required to spray the chemical on the crop plant or on the weeds. The time period of 500 to 800 msec is referred to as the upcoming time slot. By use of the executed mapping of the pixel data, the defined confidence threshold, and the set boom height, the chemical is sprayed either on the crop plant or on weeds in a controlled amount as well. In an implementation, the chemical may be sprayed on the crop plant in order to either protect the crop plant from disease or to promote the growth of the crop plant. In another implementation, the chemical may be sprayed on the weeds for weed management.

In accordance with an embodiment, the determining of the upcoming time slot to spray the chemical is further based on a size of the crop plant occupied in a two-dimensional space in x and y coordinate direction. The determination of the upcoming time slot (or the time period) to spray the chemical the crop plant is based on the size of the crop plant in the two-dimensional space in the x and y coordinate direction. In an implementation, the x and y coordinate direction indicates the direction of motion of the vehicle 104. In an example, z coordinate is used to indicate direction the height of the crop plant.

In accordance with an embodiment, the one or more hardware processors 202 are further configured to determine one or more regions in the agricultural field 106 where to spray a chemical based on the executed mapping of pixel data and the defined confidence threshold. Currently, the operations of conventional agricultural systems is based on proper demarcation of the agricultural field 106 (of FIG. 1A). In other words, row identification and row-based processing forms an indispensable component of the conventional agricultural systems. Therefore, the conventional agricultural systems fail when used in the agricultural field 106 where there is no proper demarcation of rows, like in India and many other countries. In contrast to the conventional agricultural systems, the system 102 is applicable on both that is, row based agricultural fields or non-row based agricultural fields. The one or more hardware processors 202 of the system 102 are configured to determine the one or more regions of the agricultural field 106 where to intelligently spray the chemical based on the executed mapping of pixel data and the defined confidence threshold.

In accordance with an embodiment, the specific set of electronically controllable sprayer nozzles from amongst the predefined number of electronically controllable sprayer nozzles 116 are caused to operate specifically at the determined one or more regions in the agricultural field 106 for a first time slot that corresponds to the determined upcoming time slot. After determination of the one or more regions (i.e., either row based or non-row based) in the agricultural field 106 where there is requirement to spray the chemical, the specific set of electronically controllable sprayer nozzles from amongst the predefined number of electronically controllable sprayer nozzles 116 are caused to operate for the first time slot that corresponds to the determined upcoming time slot (i.e., the time period). The specific set of electronically controllable sprayer nozzles may include either the first set or the second set or the third set in order to spray the chemicals either on the left side, or the right side, or in the front side of the vehicle 104, respectively, when the vehicle 104 is moving across the agricultural field 106. The operation of the specific set of the electronically controllable sprayer nozzles from amongst the predefined number of electronically controllable sprayer nozzles 116 is described in further detail, for example, in FIGS. 6A and 6B.

In accordance with an embodiment, the one or more hardware processors are further configured to control an amount of spray of a chemical for the first time slot from each of the specific set of electronically controllable sprayer nozzles by regulating an extent of opening of a valve associated with each of the specific set of electronically controllable sprayer nozzles. Since each of the specific set of electronically controllable sprayer nozzles is electronically controlled by use of the valve (e.g., solenoid valve) therefore, by regulating the extent of opening of the valve, the amount of spray of the chemical can be controlled for the first time slot.

In accordance with an embodiment, the one or more hardware processors 202 are further configured to communicate control signals to operate a plurality of different sets of electronically controlled sprayer nozzles at different time instants during a spray session. In order to regulate the operation of the predefined number of electronically controllable sprayer nozzles 116, the one or more hardware processors 202 are configured to communicate the control signals (e.g., clock signals) to operate the plurality of different sets of electronically controlled sprayer nozzles at different time instants during the spray session.

In accordance with an embodiment, the one or more hardware processors 202 are further configured to receive a user input, via the custom application 112 rendered on the display device 110, wherein the user input corresponds to a user-directed disablement, or an enablement of one or more electronically controllable nozzles to override an automatic activation and deactivation of the one or more electronically controllable nozzles during a spray session. In an implementation, when a user moves the vehicle 104 across the agricultural field 106 then, the user may provide the user input through the custom application 112 rendered on the display device 110. The display device 110 may be used in form of either a tablet or a smart phone which is installed on one side of the vehicle 104. The user provides the user input either for deactivating or activating the one or more electronically controllable nozzles to stop or operating, respectively, the one or more electronically controllable nozzles during the spray session. An implementation scenario of the user-directed disablement, or the enablement of one or more electronically controllable nozzles to override the automatic activation and deactivation of the one or more electronically controllable nozzles during the spray session is described in detail, for example, in FIG. 6B.

Thus, the system 102 enables an intelligent spraying of the chemicals in the agricultural field 106 and in the controlled manner. The use of the AI model 210 enables the plurality of image-capture devices 118 to capture high-quality images of the agricultural field 106 despite of variation in the environmental parameters (i.e., variation in sunlight due to either clouds or rain or shadow of a large object). Moreover, the AI model 210 enables the system 102 to clearly differentiate between two green looking objects (e.g., crop plants and weeds) and results in a controlled spraying of chemicals on the agricultural field 106. Additionally, the geospatial location correction data received from the external device 108 enables the system 102 to have an exact location of the vehicle 104 with error correction data even when the vehicle 104 is moving at a specific range of speed across the agricultural field 106. The geospatial location coordinates of the boom arrangement 114 provided by the external device 108 enables the system 102 to have a high location accuracy of the vehicle 104. Moreover, mapping of each image at the pixel level (or at the sub-pixel level) to the distance information enables the system 102 to have a more accurate location of the crop plants and weeds in the agricultural field 106 and the boom arrangement 114 so that an efficient spraying of chemicals can be achieved. Furthermore, using the specific set of electronically controllable sprayer nozzles from amongst the predefined number of electronically controllable sprayer nozzles 116 depending on the application scenario increases the efficiency and practical utility of the system 102.

Figure 3A:
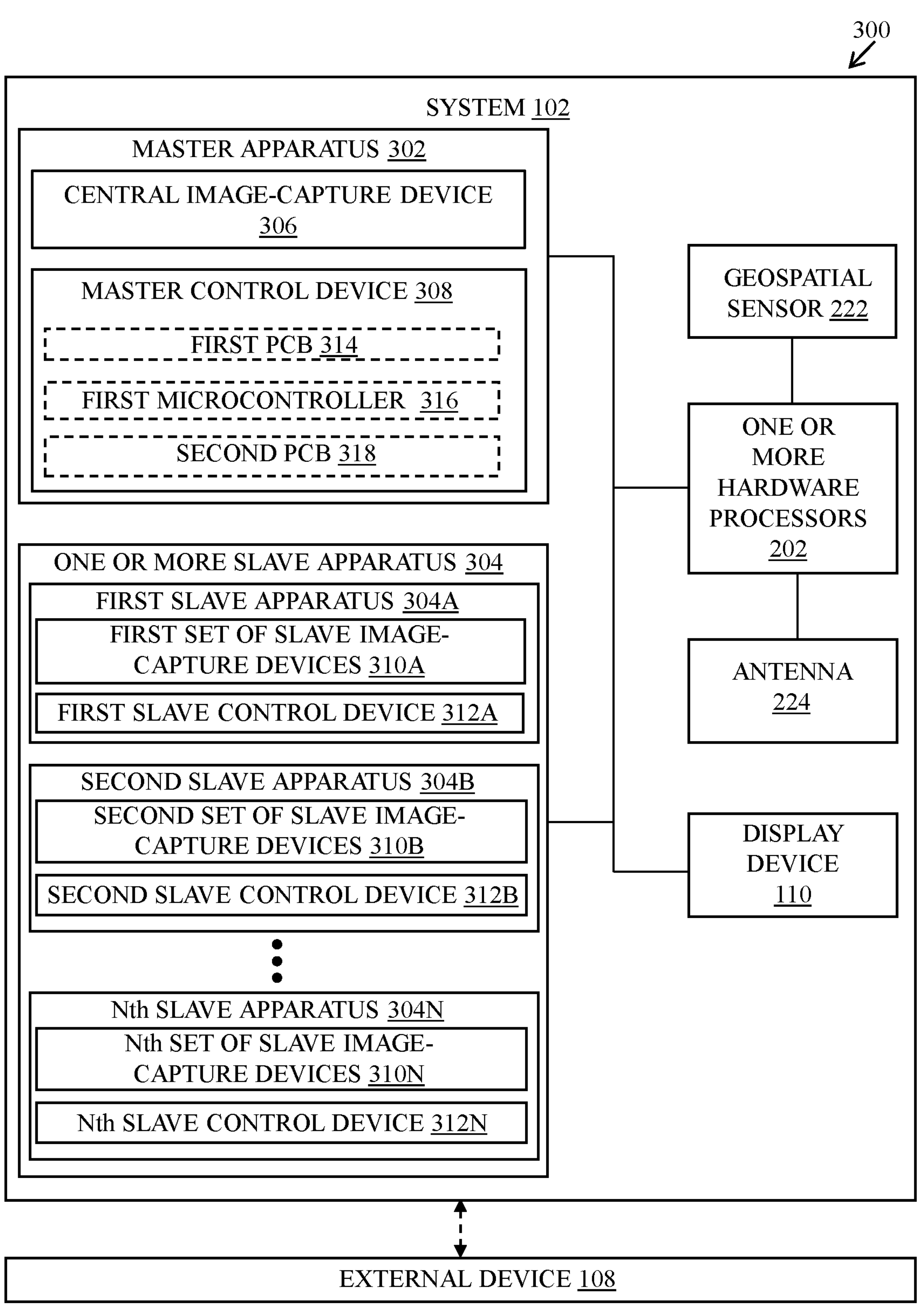
FIG. 3A is a block diagram that illustrates various exemplary components of a system, in accordance with an embodiment of the present disclosure.

FIG. 3A is a block diagram that illustrates various exemplary components of a system, in accordance with an embodiment of the present disclosure. FIG. 3A is described in conjunction with elements of FIGS. 1A, 1B and 2. With reference to FIG. 3A, there is shown a block diagram 300A of the system 102 (of FIG. 1A) mounted in a vehicle (e.g., the vehicle 104 of FIG. 1A) for agricultural applications. The system 102 includes a master apparatus 302 and one or more slave apparatus 304, such as a first slave apparatus 304A, a second slave apparatus 304B, and up-to Nth slave apparatus 304N. There is further shown the external device 108 (of FIG. 1A).

The master apparatus 302 includes a central image-capture device 306 and a master control device 308 communicatively coupled to the central image-capture device 306. In addition, the one or more hardware processors 202 of the system 102 are configured to control the master control device 308. In an example, the master apparatus 302 is configured to perform autolatry through ethernet or by using wireless communication. In addition, the master control device 308 is configured to control the central image-capture device 306, such as to collect position system (GPS) data and to determine the distance errors. The master control device 308 is also configured to determine continuously if the central image-capture device 306 is working perfectly or not. In an example, the central image-capture device 306 includes a lens with a size of 6 mm and high-density pixels for a specific use case. However, the size of the lens can be increased or decreased without limiting the scope of the present disclosure. Furthermore, the central image-capture device 306 is arranged at the centre of the system 102. Optionally, the central image-capture device 306 corresponds to the second image-capture device 118B (of FIG. 1A). Moreover, the central image-capture device 306 is configured to perform image recognition to provide a highly precise GPS location, such as with a precise value at centimetre (cm) level.

There is further provided that each slave apparatus includes a set of slave image-capture devices and a slave control device communicatively coupled to the corresponding set of slave image-capture devices. In addition, the one or more hardware processors 202 of the system 102 are configured to control each slave control device of the one or more slave apparatus 304. Moreover, the first slave apparatus 304A includes a first set of slave image-capture devices 310A and a first slave control device 312A that is communicatively coupled to the first set of slave image-capture devices 310A. In an example, the first set of slave image-capture devices 310A can include the first image-capture device 118A (or the third image-capture device 118C of FIG. 1A). Further, the second slave apparatus 304B includes a second set of slave image-capture devices 310B and a second slave control device 312B that is communicatively coupled to the second set of slave image-capture devices 310B. In an example, the second set of slave image-capture devices 310B can include the first image-capture device 118A (or the third image-capture device 118C of FIG. 1A). Similarly, the Nth slave apparatus 304N includes an Nth set of slave image-capture devices 310N and an Nth slave control device 312N, which is communicatively coupled to the second set of Nth set of slave image-capture devices 310N. In an example, each set of slave image-capture devices is located on both sides of the system 102, such as to perform image recognition. Furthermore, the central image-capture device 306 can perform all the operations performed by each set of slave image-capture devices.

In operation, the master control device 308 is configured to acquire first geospatial location data that includes a first precision value, from an inbuilt sensor of the master control device 308 and obtain location correction data from the external device 108 installed at a fixed location within a communication range of the master control device 308. In an example, the inbuilt sensor may correspond to a GPS sensor, gyroscope, and the like. Moreover, the master control device 308 is configured to obtain location correction data from the external device 108 through a long-range and low-power radio (LoRa) technology, such as to achieve precise geo-localization with minimal infrastructure requirements. Moreover, the master control device 308 is configured to acquire the first geospatial location data (or collect GPS data) to correct the first geospatial location data as well as to correct the first precision value using the location correction data. The first geospatial location and the first precision value are used to determine the speed of the vehicle 104 (i.e., at what speed the vehicle 104 is moving). In an example, the external device 108 is configured to continuously transmit the location correction data to the master control device 308, which further calculates the precise and correct value of the first geospatial location. Moreover, the master control device 308 is configured to use the LoRa technology to receive the GPS data from a satellite and obtain the location correction data from the external device 108 to determine a highly precise GPS location for spray control. In an example, the LoRa technology is intended to enable a network with correct data, such as with an improved accuracy of GPS location of around two cm or more without limiting the scope of the present disclosure. In an example, the LoRa technology is used by the external device 108 to communicate directly to each slave control device, which is further informed to the master control device 308. In another example, the LoRa technology is used by the external device 108 to communicate directly to the master control device 308 and then to each slave control device. Therefore, every communication to each slave control device is transmitted through the master control device 308, such as based on real-time communication data, which is used for low-range as well as for long-range communication with improved accuracy of the GPS location.

The master control device 308 is further configured to apply the location correction data to the first geospatial location data to generate a second geospatial location data that includes a second precision value, such as the second precision value is higher than the first precision value. In an implementation, the first geospatial location data includes the first precision value represented by 'x', 'y' coordinates, and an elevation value that is represented by 'z'. In an example, the first precision value, such as x=200, y=100, and z=5 are used to represent the first geospatial location data. Thereafter, the location correction data is received from the external device 108 that represents a location correction value (e.g., a delta difference value), which is applied to the first geospatial location data. As a result, the second geospatial location data is obtained that includes the second precision value, such as x=100, y=70, and z=3, which corresponds the accurate location value. Moreover, the second geospatial location data and the second precision value are used to determine an improved odometry value (e.g., at the centimetre level), which corresponds to a corrected distance value. The second geospatial location is further used to determine the distance moved by the vehicle 104 relative to the starting location of the vehicle 104. Thereafter, the master control device 308 is configured to communicate the generated second geospatial location data to each slave control device. In an example, the master control device 308 is configured to communicate the generated second geospatial location data to a graphical processing unit (GPU) of each slave control device, such as by using the LoRa technology. Moreover, the generated second geospatial location data received by each slave control device is used to determine the details related to the distance moved by the vehicle 104. Therefore, the generated second geospatial location data is used to improve the perceptive capability of the system 102, such that the spraying of chemicals is achieved with improved accuracy and precision for the correct time slots and at the correct intended areas or spots. Moreover, such spraying of chemicals is performed when required with a correct amount of spray and correct selection of a type of chemical irrespective of any change in the surrounding environmental conditions while capturing images of agricultural field 106.

In an implementation, each slave control device of the one or more slave apparatus 304 is further configured to acquire a plurality of different sequence of images corresponding to different field-of-views (FOVs) from the corresponding set of slave image-capture devices. For example, the first slave control device 312A of the first slave apparatus 304A is configured to acquire the plurality of different sequence of images corresponding to different FOVs from the first set of slave image-capture devices 310A. Similarly, the second slave control device 312B of the second slave apparatus 304B is configured to acquire the plurality of different sequence of images corresponding to different FOVs from the second set of slave image-capture devices 310B. The plurality of different sequence of images are stored in the memory 204 of the system 102 to build a database, which is used to distinguish between the crop plants and weeds. As a result, the system 102 can acquire the plurality of different sequence of images corresponding to different FOVs in the agricultural field 106 at same time, which is used to cover a large area of the agricultural field 106 in a short time. The plurality of different sequence of images are further used to distinguish between the crop plants and weeds irrespective of the surrounding environment-affected misidentification or deception problem. This is because in the training phase of an artificial intelligence model, the system 102 takes into account leaves drooping, a temporary change in shapes of leaves, colour change of leaves, possibility of occlusions, etc, in order to make the system 102 fail-safe.

Furthermore, each slave control device is configured to determine one or more time slots in advance to automatically perform a determined action when the vehicle 104 is in motion based on the corresponding set of slave image-capture devices and the second geospatial location data received from the master control device 308. For example, if the images captured by the first set of slave image-capture devices 310A represent that the crop plant or the weed is detected, then the second geospatial location is used to determine the location of the crop plant or the weed. Thereafter, the first slave control device 312A is configured to determine one or more time slots in advance to automatically perform the determined action when the vehicle 104 is in motion. Similarly, subsequent slave control devices are configured to automatically perform the determined action independently. Beneficially as compared to conventional approaches, each slave control device is configured to determine one or more time slots independently in advance to automatically perform the determined action without depending on rows and columns in the agricultural field 106.

In an implementation, the master control device 308 is also configured to determine the one or more time slots in advance to perform the determined action in advance based on the central image-capture device 306. For example, if the images captured by the central image-capture device 306 represent that the crop plant or the weed is detected, then the second geospatial location is used to determine the location of the crop plant or the weed. Thereafter, the master control device 308 is configured to determine the one or more time slots in advance based on the second geospatial location data, which is independent of rows and columns within the agricultural field 106. Thereafter, the master control device 308 is configured to perform the determined action in advance to maintain the crop plants in good condition and for precise growth of the crop plants. By virtue of determining the one or more time slots in advance, the master control device 308 performs the determined action without any system failure while reducing the power consumption at the time of action.

In an implementation, the master control device 308 along with the slave control device of the one or more slave apparatus 304, are configured to control a set of electronically controlled sprayer nozzles to direct a continuous release of a chemical specifically over one or more crop regions encompassing one or more crop plants for the determined time slot when the determined action is a perceptive spot spraying of the chemical. Moreover, the set of electronically controlled sprayer nozzles are controlled based on the images captured by the central image-capture device 306, the corresponding set of slave image-capture devices and based on the second geospatial location data received from the master control device 308. In an example, the master control device 308, along with the first slave control device 312A of the first slave apparatus 304A, are configured to control the set of electronically controlled sprayer nozzles to direct a continuous release of a chemical specifically over one or more crop regions encompassing one or more crop plants for the determined time slot. For example, if the images captured by the central image-capture device 306 represents one or more crop regions encompassing one or more crop plants, then the master control device 308 is configured to determine the one or more time slots in advance to perform perceptive spot spraying of the chemical, such as based on the second geospatial location. In another example, if the images captured by the first set of slave image-capture devices 310A represents one or more crop regions encompassing one or more crop plants, then the first slave control device 312A is configured to determine the one or more time slots in advance to perform perceptive spot spraying of the chemical, such as based on the second geospatial location. Therefore, the system 102 is used for selectively controlling the set of electronically controlled sprayer nozzles, which is used to reduce an overall cost of spraying, such as by avoiding unnecessary spraying on weeds. In addition, as the determined time slot is accurate, the whole crop plant is covered by the continuous release of the chemical specifically over one or more crop regions encompassing one or more crop plants. Moreover, an overall cost of spraying is also reduced as compared to existing machines that uses camera-aided systems for spraying.

In an implementation, the images captured by the central image-capture device 306 of any one of a slave image-capture device of the corresponding set of slave image-capture devices do not clearly indicate whether the crop plants are in a row or not, such as due to folded crop plants, discoloured crop plants, hidden crop plants within the soul, small sized crop plants, and the like. In such case, the master control device 308, along with the slave control device of the one or more slave apparatus 304, are configured to control the set of electronically controlled sprayer nozzles based on detected crop plants from the images, which is used to cover all the crop plants, without leaving behind any crop plants.

In an implementation, each slave control device of each slave apparatus is configured to activate and deactivate the one or more electronically controllable nozzles during the spray session based on highly precise GPS location data received from the central image-capture device 306 and based on the images received from each set of slave image-capture devices. Moreover, any communication related to highly precise GPS location data is passed from the central image-capture device 306 and through the master control device 308, and then received by each slave control device. In an example, the first slave control device 312A of the first slave apparatus 304A is configured to receive the highly precise GPS location data from the central image-capture device 306 and receive the images from the first set of slave image-capture devices 310A (i.e., through the master control device 308). Moreover, the images received from the first set of slave image-capture devices 310A represents that the crop plants are present in the agricultural field 106. Furthermore, the highly precise GPS location data is used to determine the location of the vehicle 104 and also to determine the location of the crop plants. Thereafter, the first slave control device 312A is configured to activate the one or more electronically controllable nozzles during the spray session only based on the highly precise GPS location data, such as to release the chemical specifically over one or more crop regions encompassing one or more crop plants for the determined time slot. In addition, the first slave control device 312A is configured deactivate other electronically controllable nozzles, where the crop plants are not present, which is useful to reduce an overall cost. Similarly, each slave control device is configured to activate and deactivate the one or more electronically controllable nozzles with improved accuracy, such as based on highly precise GPS location.

In an implementation, the master control device 308 is configured to dynamically update the one or more crop regions encompassing the one or more crop plants based on a change in a front buffer and a rear buffer set for the central image-capture device 306. In an implementation, the front buffer, and the rear buffer of the central image-capture device 306 is calculated by analyzing the data as receive from the agricultural field 106. Moreover, value of the front buffer corresponds to buffer value before the which the extent of an action area of the determined action can be started. For example, the front buffer can be used to start spraying over the crop plant when the set of electronically controlled sprayer nozzles are about to go over the crop plant (or withing a first bounding box). Similarly, the rear buffer value corresponds to buffer value after which extent of action area of the determined action can be stopped. For example, the rear buffer can be used to stop spraying over the crop plant when the set of electronically controlled sprayer nozzles have gone over the crop plant (or over a last bounding box or a second bounding box). In an example, the analysis of the data as receive from the agricultural field 106 provides heuristics to arrive at a value for both the front buffer and the rear buffer. Optionally, the values of the front buffer and the rear buffer ranges from 2 cm to 3 cm. However, the values of the front buffer and the rear buffer can be tuned (i.e., can be increased or decreased) from one field to other field and based on size of the crop plants. Moreover, the front buffer and the rear buffer for the central image-capture device 306 may be changed automatically by the master control device 308 or may be changed through a user input, such as based on the size of the crop plants, condition of the crop plants (e.g., hidden, folded, and the like). Thereafter, the master control device 308 is configured to dynamically update the one or more crop regions encompassing the one or more crop plants based on the change in the front buffer and the rear buffer. For example, if a region is determined as 15 cm length and 15 cm breadth around the crop plants. Thus, increasing the front buffer to 5 cm may extend the spray region ahead of the crop plant by 5 cm, for example, now 20 cm length. Similarly, increasing the rear buffer, say by 3 cm, may dynamically extend the spray area to 3 cm from the rear end/behind the crop plant in the direction of movement of the vehicle 104. Therefore, the front buffer and the rear buffer for the central image-capture device 306 are used by the master control device 308 to determine the one or more time slots in advance to automatically perform the determined action when the vehicle is in motion. In addition, the front buffer and the rear buffer for the central image-capture device 306 are used by the master control device 308 to automatically expand or adjust the one or more crop regions. In other words, if a user wants to cover not only the crop plant but also some more area around the crop plant, to be very sure of spray in a large agricultural field. This capability is provided by this technical implementation and use of front buffer and rear buffer when the vehicle 104 is in motion.

In an implementation, each slave control device of the one or more slave apparatus 304 is configured to dynamically update the one or more crop regions encompassing the one or more crop plants based on a change in a front buffer and a rear buffer associated with each slave image-capture device of the corresponding set of slave image-capture devices. In an implementation, the front buffer, and the rear buffer of each slave image-capture device of the corresponding set of slave image-capture devices are calculated by analyzing the data as receive from the agricultural field 106. In an example, the front buffer and the rear buffer for each slave image-capture device of the first set of slave image-capture devices 310A may be changed automatically by the first slave control device 312A or may be changed through on a user input. Furthermore, the front buffer and a rear buffer associated with the first set of slave image-capture devices 310A can be changed based on the images captured by the first set of slave image-capture devices 310A, such as based on the size of the crop plants or condition of the crop plants (e.g., hidden, folded, and the like). Moreover, the first slave control device 312A of the first slave apparatus 304A is configured to dynamically update the one or more crop regions encompassing the one or more crop plants based on the change in the front buffer and the rear buffer. Similarly, other slave control devices of the one or more slave apparatus 304 are configured to dynamically update the one or more crop regions encompassing the one or more crop plants. Optionally, such update may occur automatically by the one or more hardware processors 202 of the system 102 or can be performed through a user input. Moreover, the first slave control device 312A is further configured to determine one or more regions in the agricultural field 106 where to spray the chemical based on the executed mapping of pixel data, a defined confidence threshold, the front buffer, and the rear buffer associated with each slave image-capture device of the corresponding set of slave image-capture devices. Furthermore, this combination of features (i.e., the executed mapping of pixel data, a defined confidence threshold, the front buffer, and the rear buffer associated with each slave image-capture device) surprisingly further makes the system 102 more accurate even in adverse real-world and practical situations to solve the surrounding environment-affected misidentification or deception problem and accommodate any new use case requested by a user.

In an implementation, the master control device 308 along with each slave control device of the one or more slave apparatus 304 are configured to control one or more pairs of weeding blades. Moreover, weeding blades of each pair of weeding blades are moved close to each other to uproot weeds between two crop plants and automatically moved apart from each other for the determined time slot ahead of a position of each crop plant in the agricultural field 106 to bypass each crop plant as well as to uproot the weeds around each crop plant when the determined action is a perceptive weed uprooting action. In other words, when determined action of the system 102 is the perceptive weed uprooting action, then the one or more hardware processors 202 are configured to command the master control device 308 along with each slave control device of the one or more slave apparatus 304 to control the one or more pairs of weeding blades. Such as, based on the corresponding set of slave image-capture devices and the second geospatial location data received from the master control device 308. For example, if the images captured by the central image-capture device 306 represent that the weeds are present in the FOV of the central image-capture device 306, then the second geospatial location is used to determine the location of the weeds. Thereafter, the master control device 308 is configured to determine the one or more time slots in advance based on the second geospatial location data, which is independent of rows and columns within the agricultural field 106. Furthermore, the master control device 308 is configured to perform the determined action, such as to control the first weeding blade 124A and the second weeding blade 124B (of FIG. 1C) to perform the perceptive weed uprooting action in advance to uproot weeds between two crop plants. Similarly, each slave control device of the one or more slave apparatus 304 are configured to control one or more pairs of weeding blades to perform the perceptive weed uprooting action in advance to uproot weeds between two crop plants. Moreover, after uprooting the weeds, the weeding blades of each pair of weeding blades automatically moved apart from each other for the determined time slot ahead of the position of each crop plant in the agricultural field 106 to bypass each crop plant. As a result, the master control device 308 along with each slave control device of the system 102 are used for selective uprooting the weeds only, without causing any harm to the crop plants. In an example, the images captured by any one of a slave image-capture device of the corresponding set of slave image-capture devices do not clearly indicate that the weeds are in a row or not, such as if the weeds are folded, hidden, or miscoloured. In such case, the master control device 308 along with the slave control device of the one or more slave apparatus 304 are configured to control the one or more pairs of weeding blades for selectively uprooting of the weeds around the crop plants.

The system 102 is technically advanced in terms of its perceptive ability and is intelligent enough to adapt to uneven agricultural land, is astutely perceptive to real-time changes in the surrounding environmental conditions, and not dependent on any row-identification. For example, in conventional systems, if crops are planted in proper rows and columns in an agricultural field, then only camera-assisted or camera-aided machines can function in real-world conditions. Unlike the conventional systems, the disclosed system of the present invention does not need any prior plantation format to be followed. The master control device 308 of the system 102 is configured to control the central image-capture device 306. Moreover, the master control device 308 is configured to collect position system (e.g., global satellite-based positioning system, such as GPS) data as well as obtain location correction data from the external device 108 through a long-range and low-power radio (LoRa) achieve precise geo-localization with minimal infrastructure requirements. The location correction data from the external device 108 is applied on the first geospatial location to generate the second geospatial location data including the second precision value (i.e., highly accurate as compared to initial location derived from GPS, for example). Furthermore, the first geospatial location and the first precision value are used to determine the speed of the vehicle 104 (i.e., at what speed the vehicle 104 is moving). In addition, the second geospatial location data provides a significantly improved positional accuracy of the master control device 308, i.e., provides a centimetre (cm) level accuracy of position of the master control device 308 when the vehicle 104 is in motion. In addition, the second geospatial location data and the second precision value are used to determine an improved odometry value (e.g., at the centimetre level), which corresponds to a corrected distance value, such as the distance moved by the vehicle 104 relative to the starting location of the vehicle 104. Therefore, the generated second geospatial location data is used to improve the perceptive capability of the system 102 and to identify the correct time slots and at the correct intended areas or spots where a defined action is to be taken. In addition, every communication to each slave control device is transmitted through the master control device 308, which in turn provides an economic significance and benefits as additional circuitry is not required in each slave control device. Beneficially as compared to conventional approaches, each slave control device and the master control device 308 are technically advanced to accurately perform the defined action without depending on any demarcation of rows and columns in the agricultural field 106 and has the ability to differentiate between two green looking objects (e.g., crop plants and weeds) by effectively handling the problem of surrounding environment-affected misidentification or deception caused due to the temporal change of shape of leaves due to a sudden movement of air, a part occlusion of a crop plant, temporary leaves drooping problem, and the like.

Figures 3B, 3C:
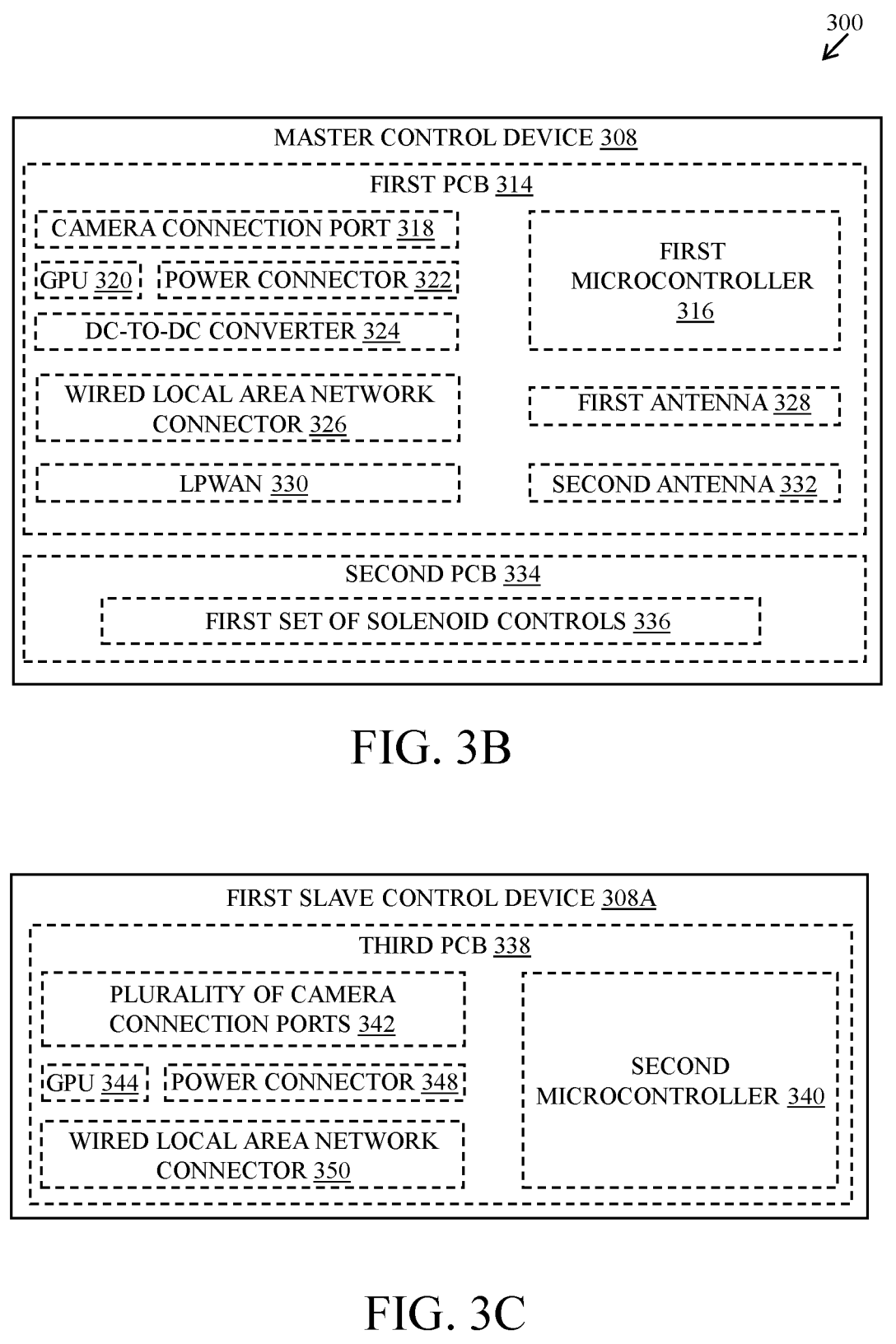

FIG. 3B is a block diagram that illustrates various exemplary components of a master control device, in accordance with an embodiment of the present disclosure. FIG. 3B is described in conjunction with elements of FIGS. 1A, 1B, 2 and 3A. With reference to FIG. 3B, there is shown a block diagram 300B that illustrates various exemplary components of the master control device 308.

In an implementation, the master control device 308 includes a first printed circuit board (PCB) 314 that includes a first microcontroller 316 for a first level of processing that includes booting different components of the first PCB 314. In an example, the different components of the first PCB 314 correspond to electronic components, such as amplifier, rectifier, and the like. Moreover, the first microcontroller 316 is also configured for switching one of one or more buffer circuits 307 associated with the central image-capture device 306. Therefore, by virtue of switching one of the one or more buffer circuits 307, there exists a change in the front buffer and the rear buffer of the central image-capture device 306, which is advantageous to automatically change an extent of an action area of the determined action by the implement attached to the vehicle 104. In addition, the first microcontroller 316 is also configured to control a sequence of power supply to the different components of the first PCB 314. The sequence of power supply is used to provide a desired power supply to the different components of the first PCB 314, such as low power to certain components, and high-power supply to other components. For example, if the determined action is a perceptive spot spraying of the chemical, then the sequence of power supply is used to provide a desired power supply to control a set of electronically controlled sprayer nozzles. However, if the determined action is a perceptive weed uprooting action, then the sequence of power supply is used to provide a desired power supply to control the one or more pairs of weeding blades.

In such implementation, the first PCB 314 of the master control device 308 further includes a camera connection port 318 to connect to the central image-capture device 306 (of FIG. 3A). The first PCB 314 further includes a graphics processing unit (GPU) 320 to process a sequence of images captured by the central image-capture device 306. In an example, the sequence of images captured by the central image-capture device 306 are received by the GPU 320 through the camera connection port 318. Thereafter, the GPU 320 is configured to use a deep learning model to process the sequence of images, such as to resize the size of the sequence of images, which is used for the distinguish between the crop plants and the weeds. In an example, if the images captured by any of the image-capture device takes into account drooping of leaves, a temporary change in shape of leaves due to movement of air, a part occlusion of leaves due to high density of weeds, etc. This causes the system to accurately identify the crop plants and distinguish from the weeds, which is further used to automatically change an extent of an action area of the determined action by the implement attached to the vehicle 104.

The first PCB 314 further includes a power connector 322 to receive a mains power supply from a battery of the vehicle 104. The power connector 322 is used to provide a desired voltage and current for the first microcontroller 316. Furthermore, the first PCB 314 includes a direct current (DC)-to-DC converter 324 to supply a filtered current to the different components of the first PCB 314 from the mains power supply to reduce maintenance and improve a total operating-life of the system 102. Moreover, the filtered current supplied by the DC-to-DC converter 324 is used to protect the different components of the first PCB 314 from over current supply. In such implementation, the first PCB 314 of the master control device 308 further includes a wired local area network connector 326 configured to connect to each slave control device of the one or more slave apparatus 304 (of FIG. 3A). The wired local area network connector 326 is used by the master apparatus 302 to communicate with each slave control device, such as the first slave control device 312A (of FIG. 3A) and the second slave control device 312B (of FIG. 3A). In addition, the first PCB 314 includes a first antenna 328 to obtain the location correction data from the external device 108 via a low-power wireless wide area network (LPWAN) 330. The first PCB 314 further includes a second antenna 332 that is configured to establish a remote connectivity with a server via a cellular network. Therefore, the second antenna 332 is used by the master control device 308 to collects GPS data through the remote connectivity with the server via the cellular network. Moreover, the first antenna 328 is used to obtain the location correction data from the external device 108. Thereafter, the master control device 308 is configured to correct the GPS data using location correction data received from the external device 108 through the LPWAN 330, which is used to generate a second geospatial location data that includes a second precision value.

In an implementation, the master control device 308 further includes a second PCB 334 that further includes a first set of solenoid controls 336. The first set of solenoid controls 336 are used to control at least one spray controller (e.g., a solenoid) from the plurality of spray controllers 208 (of FIG. 2). For example, to activate a specific set of spray valves associated with the identified sprayer nozzles, and simultaneously deactivate another specific set of spray valves associated with the identified sprayer nozzles.

FIG. 3C is a block diagram that illustrates various exemplary components of a slave control device, in accordance with an embodiment of the present disclosure. FIG. 3C is described in conjunction with elements of FIGS. 1A, 1B, 2, 3A and 3B. With reference to FIG. 3C, there is shown a block diagram 300C that illustrates various exemplary components of the of the first slave control device 312A. In an implementation, other slave control devices can include similar exemplary components.

In an implementation, each slave control device of the one or more slave apparatus 304 includes a third PCB. For example, the first slave control device 312A includes a third PCB 338. Furthermore, the third PCB 338 includes a second microcontroller 340 for a first level of processing that includes booting different components of the third PCB 338. In an example, different components of the third PCB 338 corresponds to electronic components, such as amplifier, rectifier, and the like. In addition, the second microcontroller of each slave control device is further configured for switching one of one or more buffer circuits 311A-to-311N associated with each slave image-capture device of the corresponding set of slave image-capture devices. In an example, the second microcontroller 340 is configured for switching a first buffer circuit 311A associated with each slave image-capture device of the first set of slave image-capture devices 310A. In another example, the second microcontroller 340 is configured for switching a second buffer circuit 311B associated with each slave image-capture device of the second set of slave image-capture devices 310B, and the like. By virtue of switching one of the one or more buffer circuits 311A-to-311N, there exists a change in the front buffer and the rear buffer of each slave image-capture device of the first set of slave image-capture devices 310A, which is advantageous to automatically change an extent of an action area of the determined action by the implement attached to the vehicle 104.

In such implementation, the third PCB of each slave control device further includes a plurality of camera connection ports to connect to the corresponding set of slave image-capture devices. For example, the third PCB 338 of the first slave control device 312A includes a plurality of camera connection ports 342. In an example, the plurality of camera connection ports 342 may be referred to as a connection port, such as a universal serial port (USB), a serial port, and the like. Moreover, the plurality of camera connection ports 342 can be used to supply power to the first set of slave image-capture devices 310A of the first slave apparatus 304A.

In an implementation, the third PCB 338 further includes a graphics processing unit (GPU) to process a different sequence of images captured by each slave image-capture device of the corresponding set of slave image-capture devices. For example, the third PCB 338 of the first slave control device 312A includes a GPU 344, which is used to process the different sequence of images captured by each slave image-capture device of the first set of slave image-capture devices 310A. In an example, the GPU 344 is configured to perform similar processing simultaneously and independently for each slave image-capture device of the first set of slave image-capture devices 310A. As a result, different sequence of images processed by the GPU 344 can be used by the first slave control device 312A to control a fixed number of spray controllers (e.g., ten number of spray controllers) from the plurality of spray controllers 208 (of FIG. 2) simultaneously and independently. In an example, half of the fixed number of spray controllers can be connected to one slave image-capture device camera and another half of the fixed number of spray controllers can be connected to another slave image-capture device of the first set of slave image-capture devices 310A.

In an implementation, the third PCB 338 further includes a power connector 348 to receive a power supply via the master control device 308. Therefore, the master control device 308 is used to control the third PCB 338 through the power connector 348. Moreover, the power connector 348 can be used to transmit power supply from the master control device 308 to the second microcontroller 340 and the GPU 344. In addition, the third PCB 338 includes a wired local area network connector 350 that is configured to connect to the master control device 308. The wired local area network connector 350 is used by the first slave control device 312A to receive the generated second geospatial location data from the master control device 308 with improved speed. Moreover, the wired local area network connector 350 is used to transmit every communication to each slave control device from the master control device 308, such as based on real-time communication data, which is used for low-range as well as for long-range communication with improved accuracy of the GPS location.

Figure 4:
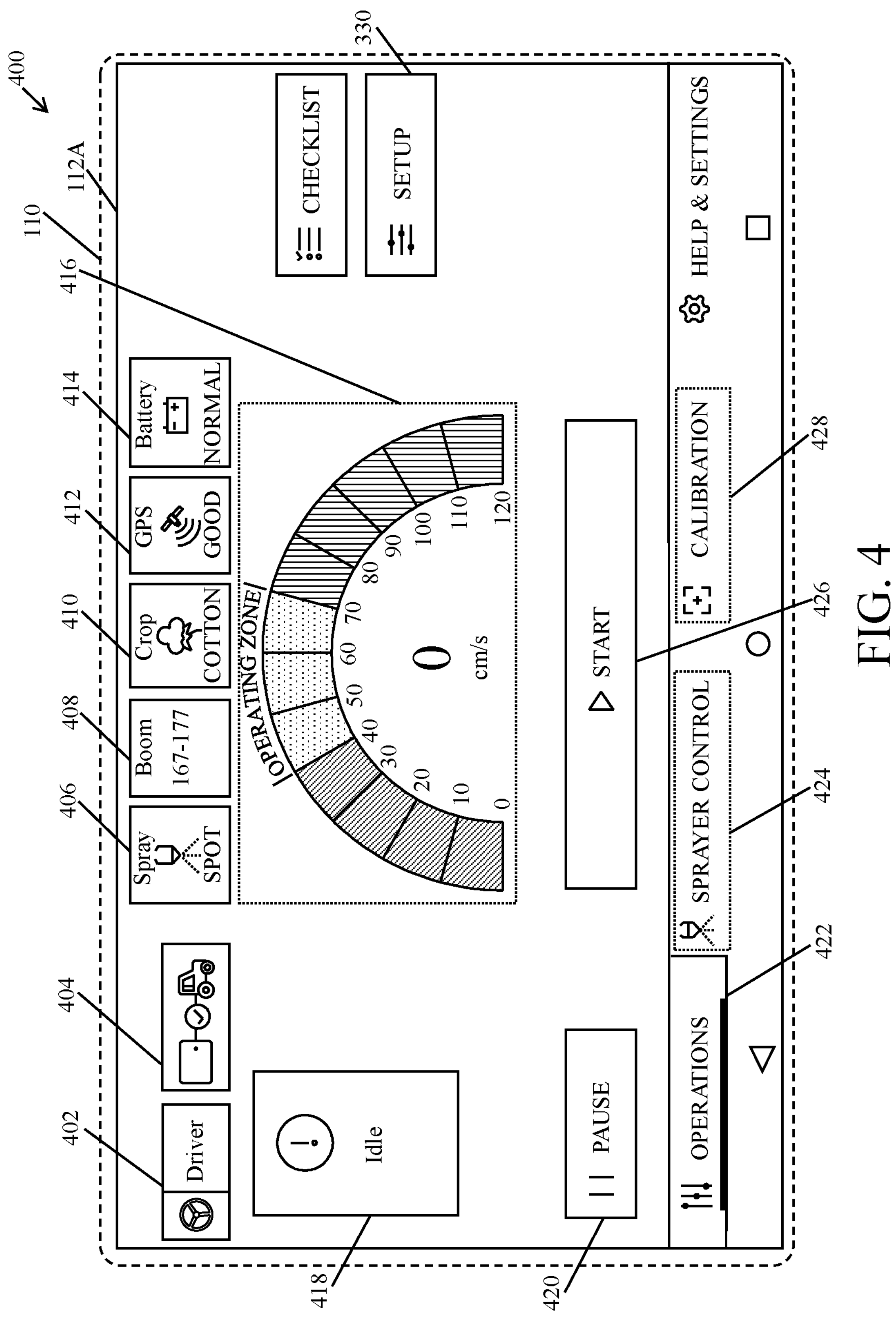
FIG. 4 is a diagram illustrating an exemplary scenario related to a defined confidence threshold used for controlled and perceptive chemical spraying on an agricultural field, in accordance with an embodiment of the present disclosure.

FIG. 4 is an exemplary scenario that illustrates an operating zone of a vehicle, in accordance with an embodiment of the present disclosure. FIG. 4 is described in conjunction with elements from FIGS. 1A, 1B, 2, 3A, 3B, and 3C. With reference to FIG. 4, there is shown an exemplary scenario 400 that illustrates the operating zone of the vehicle 104 (of FIG. 1A) via a UI 112A rendered on the display device 110. There is further shown different UI elements, such as UI elements 402 to 430, on the UI 112A.

In accordance with an embodiment, the specific set of electronically controllable sprayer nozzles are operated further based on a predefined operating zone (indicated by the UI element 416) of the vehicle 104, where the predefined operating zone (indicated by the UI element 416) defines a range of speed of the vehicle 104 in which an accuracy of the detection sensitivity of the crop plant is greater than a threshold. The predefined operating zone of the vehicle 104 means that when the vehicle 104 is moved through the agricultural field 106 in a specific range of speed, for example, from 40 to 70 cm/second (s), the accuracy of the detection sensitivity of the crop plant is greater than the threshold. Alternatively stated, the crop plant can be detected, tracked, identified with a crop type, and distinguished with weeds and any other green looking objects with improved accuracy in the predefined operating zone of the vehicle 104.

In an implementation, a custom application 112 is pre-installed in the display device 110. The custom application 112 has many UI interfaces, where the UI 112A is one of the many UI interfaces. The custom application 112 is designed and configured to directly establish a communication with a Robot Operating System (ROS) layer of the system 102 to perform any specified operations of the system 102.

The UI element 402 indicates a driver role and corresponding functions made available to a user operating the vehicle 104 as per the defined driver role. The UI element 404 indicates a connection status of the system 102 with an external source, such as the external device 108. The UI element 406 indicates a spray mode selected as a perceptive spot spraying mode. The UI element 408 indicates a predetermined boom height range that is optimal for a tallest plant height determined by the system 102 as well a current boom height from the ground plane. The boom height range is determined for a given plant height based on experimentation where an optimal result was achieved previously and saved in a database for later use. The UI element 410 indicates a type of crop plant (such as a cotton plant in this case) that is current object-of-interest, to be acted on or sprayed with a specified chemical. The UI element 412 indicates a geospatial sensor signal quality (e.g., GPS signal quality) is good or not. The UI element 414 indicates battery status of the system 102 to power the components of the system 102. The UI element 418 indicates a current device activity status, i.e., whether the system 102 is in operation or idle. The UI element 420 indicates a pause or resume function in terms of operation of the system 102. The UI element 422 provides a control to visualize/update various operations and its corresponding settings or parameters. The UI element 424 is a sprayer control that provides an option to test and manually enable or disable some selected electronically controllable sprayer nozzles of the predefined number of electronically controllable sprayer nozzles 116. Such manual selection is sometimes needed to avoid double spraying of chemicals or under some unforeseen scenarios. An example is of such circumstance is explained in FIG. 6B. In an implementation, the predefined number of electronically controllable sprayer nozzles 116 may be segregated into different units, such as a first sprayer unit, a second sprayer unit, and a third sprayer unit. Each sprayer unit may include certain number of electronically controllable sprayer nozzles, for example, 5-10 or 8 electronically controllable sprayer nozzles. Moreover, each sprayer unit may be regulated and controlled by input received from one image-capture device of the plurality of image-capture devices 118.

This segregation makes the processing very fast and avoids any unwanted delay or error in processing to accurately operate the system 102 for controlled and perceptive spraying of chemical as per need. The UI element 426 is a control to start or stop the system 102. When a user input that corresponds to the start of the system 102 is provided, all sensors and components of the system 102 are activated via commands shared with the ROS layer of the system 102. The UI element 428 is a control to check and run nozzle calibration before start of a spray session to make sure the predefined number of electronically controllable sprayer nozzles 116 are clean and ready to operate. Based on a user input (e.g., a touch input) on icon of each spray nozzle, it can be verified if the nozzle is operating as expected. The icon changes to indicate a correct functioning of the selected nozzle to the user while the user within the vehicle. The UI element 430 indicates an operations setup for a user-controlled spray mode selection, a crop selection, or a crop height verification or edit option, if needed in any situation.

Figure 5:
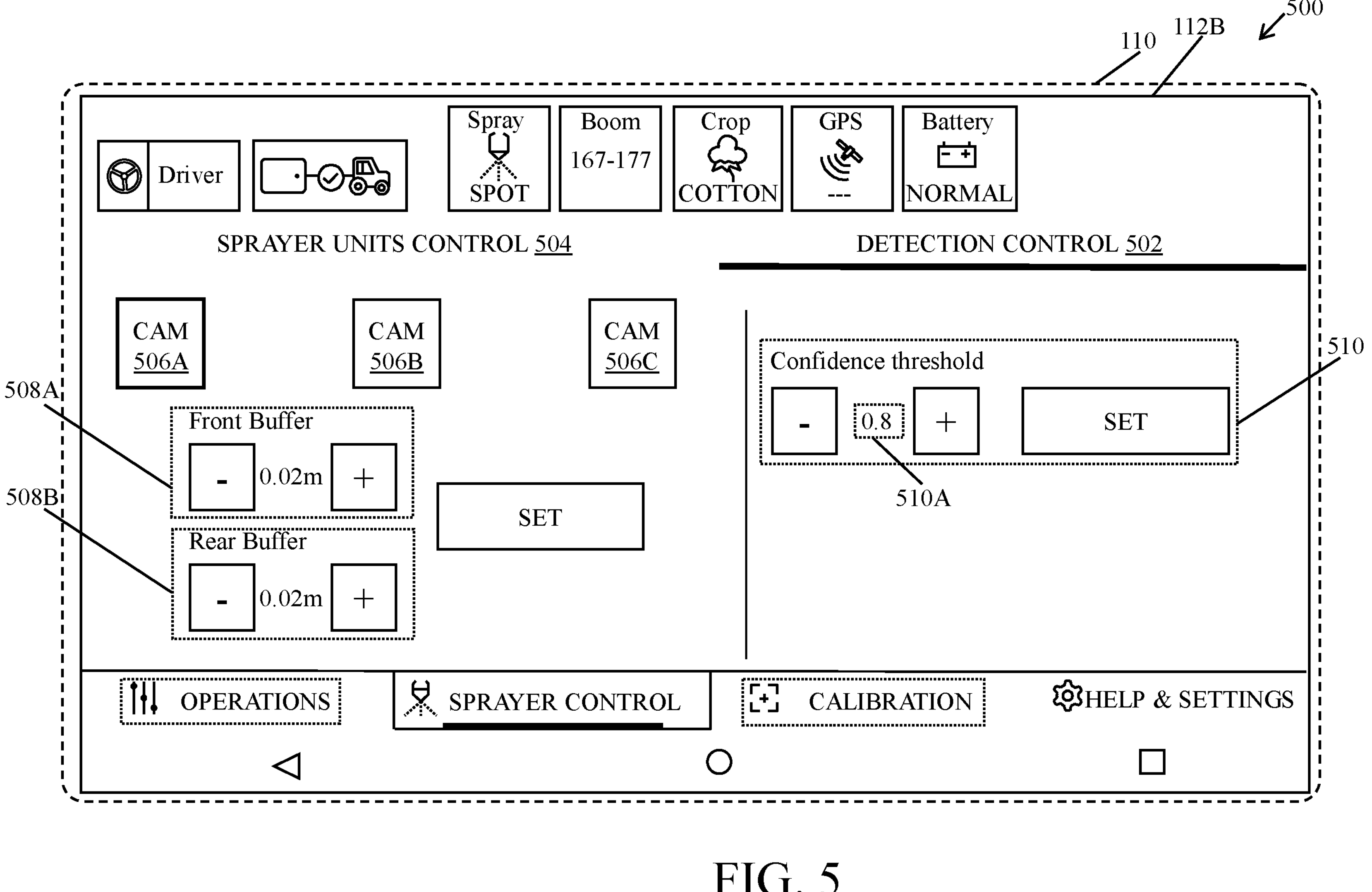
FIG. 5 is a diagram illustrating an exemplary scenario related to an operating zone of a vehicle for controlled and perceptive chemical spraying on an agricultural field, in accordance with an embodiment of the present disclosure.

FIG. 5 is an exemplary scenario of setting a defined confidence threshold and camera buffers, in accordance with an embodiment of the present disclosure. FIG. 5 is described in conjunction with elements from FIGS. 1A, 1B, 2, 3A, 3B, 3C and 4. With reference to FIG. 5, there is shown an exemplary scenario 500 that illustrates setting of the defined confidence threshold 510A on the UI 112B rendered on the display device 110. There is further shown different UI elements, such as UI elements 502 to 510, on the UI 112B.

In an implementation, the defined confidence threshold 510A is set in real-time or near real-time in the AI model 210 of the system 102. Alternatively, the defined confidence threshold 510A is pre-set via the UI 112B rendered on the display device 110 communicatively coupled to the one or more hardware processors 202. In yet another implementation, the defined confidence threshold 510A is adaptive and may automatically be changed depending on a surrounding environment condition, a crop type, and/or a captured image input from the plurality of image-capture devices 118. Examples of the surrounding environmental conditions while capturing images of the agricultural field 106 may include but are not limited to a variation in sunlight due to either cloud, rain, a shadow of a large object, like tree, in an image, a change in position of sun throughout the day, a change in light intensity, a time of day when farming is done etc, an extent of resistance from mud in the agricultural field 106.

In the exemplary scenario 500, the UI element 502 is a detection control that controls detection sensitivity of the crop plant by calibrating the defined confidence threshold 510A as indicated by the UI element 510. The defined confidence threshold 510A is automatically (or optionally manually) increased or decreased, depending on the requirement. If the defined confidence threshold 510A, detection sensitivity of the crop plant increases. The confidence threshold value may range from 0 to 1. An increase or decrease of the defined confidence threshold 510A changes i.e., increases, or decreases the perceptiveness of the system 102. For example, at a first defined confidence threshold, say 0.X1, the one or more hardware processors 202 are configured to distinguish between green looking objects, such as crop plants and weeds. At a second defined confidence threshold, say 0.X2, the one or more hardware processors 202 are configured to further distinguish between a type of crop plant and a type of weed. At a third defined confidence threshold, say 0.X3, the one or more hardware processors 202 are configured to further distinguish between a diseased or a non-diseased crop plant and further distinguish weeds from such diseased or non-diseased crop plants. At a fourth defined confidence threshold, say 0.X4, the one or more hardware processors 202 are configured to further increase crop detection sensitivity such that a discoloured plant or non-discoloured plant, a growth state of the crop plant, a lack of nutrient etc. can be further sensed and additionally distinguish from weeds. Such detection sensitivity is very advantageous and provides a technical effect of increased perceptiveness of the system 102 resulting in improved performance of the system 102, such as reduced wastage of chemical used for spraying. Alternatively state, the use of the defined confidence threshold 510A significantly improves the perceptive capability of the system 102 such that the spraying of chemicals is achieved with improved accuracy and precision for the correct time slots, at correct intended areas or spots and only when required with correct amount of spray and correct selection of a type of chemical irrespective of any change in the surrounding environmental conditions while capturing images of the agricultural field 106. For example, an increase or a decrease in the defined confidence threshold 510A dynamically changes the detection sensitivity of the crop plant increasing the perceptive capability of the system 102 making the system fail-safe.

In an example, two different chemicals can be loaded in two different chemical storage chambers in the vehicle 104. A specific chemical type is used only when a discoloured crop plant is detected by a specific nozzle while some nozzles may use another chemical to spray on normal/healthy crop plant, and remaining nozzles may be deactivated to stop spraying on weeds or unwanted regions. Thus, different applications are made possible by calibration of the defined confidence threshold 510A.

In accordance with an embodiment, the one or more hardware processors 202 are configured to update the defined confidence threshold in response to a change in a quality parameter of the captured plurality of FOVs of the plurality of defined areas of the agricultural field 106. For example, when there is a change in the quality parameter of the captured plurality of FOVs, that means some images are captured in a sunny environment, a few images are captured in a cloudy environment and a few other images are captured in rainy environment or there is some shadow, then according to the change in the quality parameter, the defined confidence threshold 510A is dynamically updated to maintain the spray accuracy greater than a threshold, for example, greater than 95-99.99%.

In an implementation, the defined confidence threshold is defined as a minimum confidence the model includes on a detected object. In an example, the value of defined confidence threshold lies between (0.0. 1.0). Moreover, data related to the crop plants is analysed to create a ROC curve that represents the performance of a classification model at all classification thresholds. Thus, the ROC curve is drawn with precision as the x-axis and recall as the y-axis for different values of defined confidence threshold. Moreover, the ROC curve is used to determine the value of the defined confidence threshold for which the precision and recall values are optimal (e.g., if recall is higher, then precision is not too low or high).

In an implementation, the UI element 504 is a sprayer units' control where a front buffer 508A and a rear buffer 508B associated with each image-capture device indicated by UI elements 506A, 506B, and 506C, of the plurality of image-capture devices 118, may be set. Such setting may occur automatically by the one or more hardware processors 202 or may be done based on a user input. The one or more hardware processors 202 are further configured to determine one or more regions in the agricultural field 106 where to spray a chemical based on the executed mapping of pixel data, the defined confidence threshold 510A, and the front buffer 508A and the rear buffer 508B associated with each image-capture device of the plurality of image-capture devices 118. For example, if a region is determined as 15 cm length and 15 cm breadth. Thus, increasing the front buffer 508A to 5 cm may extend the spray region ahead of the crop plant by 5 cm, for example, now 20 cm length. Similarly, increasing the rear buffer 508B, say by 3 cm, may dynamically extend the spray area to 3 cm from the rear end/behind the crop plant in the direction of movement of the vehicle 104.

Figure 6A:
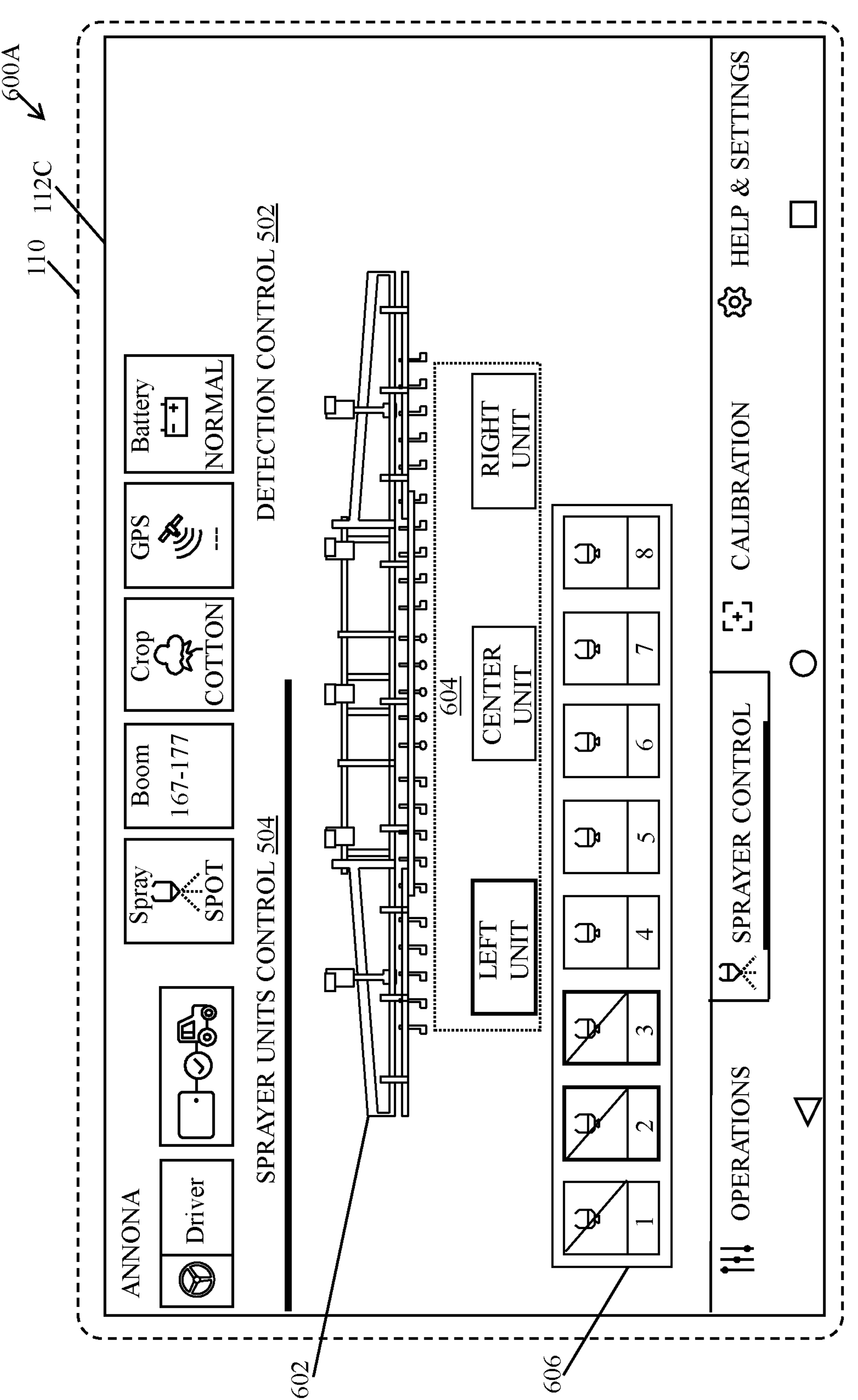
FIGS. 6A and 6B are diagrams collectively illustrating an exemplary scenario for implementation of the system and method for controlled and perceptive chemical spraying on an agricultural field, in accordance with an embodiment of the present disclosure.
Figure 6B:
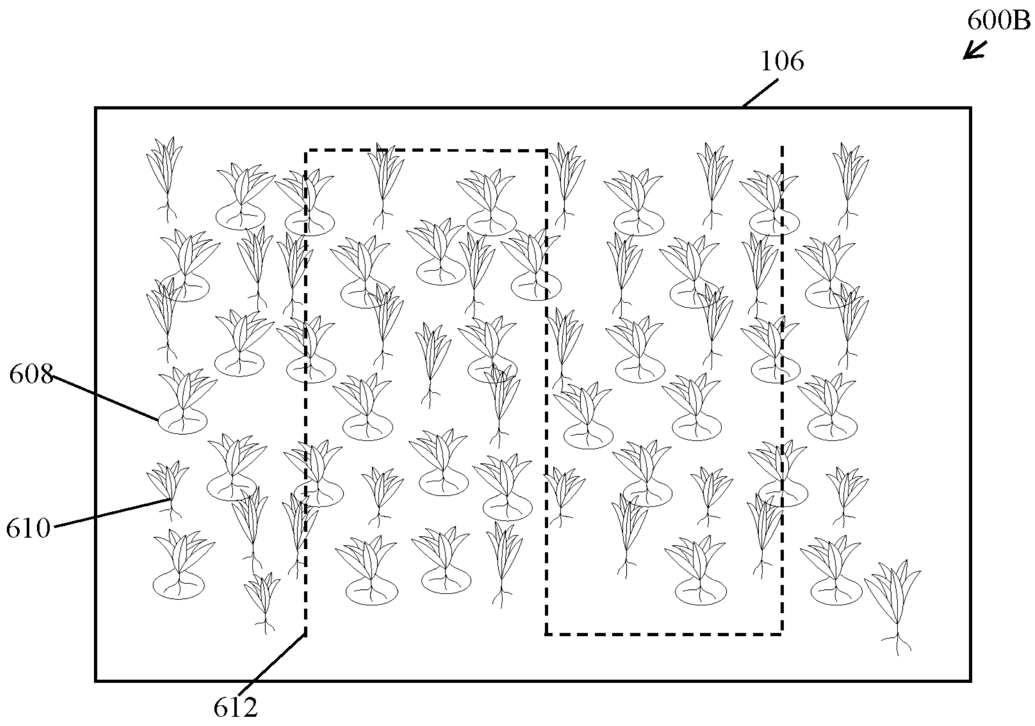

FIGS. 6A and 6B are diagrams collectively illustrating an exemplary scenario for implementation of the system and method for controlled and perceptive chemical spraying on an agricultural field, in accordance with an embodiment of the present disclosure. FIG. 6A is described in conjunction with elements from FIGS. 1A, 1B, 2, 3A, 3B, 3C, 4 and 5. With reference to FIG. 6A, there is shown an exemplary scenario 600A that illustrates the operating zone of the vehicle 104 (of FIG. 1A) via a UI 112C rendered on the display device 110. There is further shown different UI elements, such as UI elements 602 to 606, on the UI 112C.

In the exemplary scenario 600A, the UI element 602 indicates position of the boom arrangement 114. The UI element 602 is used to control the predefined number of electronically controllable sprayer nozzles 116. The predefined number of electronically controllable sprayer nozzles 116 are divided into three units (represented by the UI element 604), for example, a left unit, a right unit, and a centre unit. There is further shown a selection of the left unit (represented by a thick box). Moreover, the UI element 606 indicates that the left unit includes a total of eight electronically controllable sprayer nozzles out of which first three sprayer nozzles are deactivated manually by use of the UI element 606. In another implementation scenario, the first three sprayer nozzles can be automatically deactivated by use of the AI model 210. The deactivation of the first three sprayer nozzles is performed in order to perform the controlled and perceptive chemical spraying on the agricultural field 106, for example, not to spray again crop plants when the vehicle 104 moves in opposite direction to cover another set of crop plants, like shown, for example, in FIG. 6B.

With reference to FIG. 6B, there is shown an implementation scenario 600B that illustrates selection of the specific set of electronically controllable sprayer nozzles from amongst the predefined number of electronically controllable sprayer nozzles 116 of the boom arrangement 114. In the implementation scenario 600B, there is shown that the agricultural field 106 comprises a plurality of crop plants, such as a crop plant 608 (e.g., cotton plants) and a plurality of weeds, such as a weed 610. The plurality of crop plants and the plurality of weeds are grown unevenly in the agricultural field 106. A dotted path 612 illustrates the movement of the vehicle 104 across the agricultural field 106. As the implementation scenario 600B illustrates a specific area of the agricultural field 106, thus the dotted path 612 for the movement of the vehicle 104 can vary to cover full area of the agricultural field 106. The system 102 is configured to spray the chemicals on the plurality of crop plants only of the agricultural field 106. When the vehicle 104 starts moving across the agricultural field 106 in a first direction until edge of the portion of the agricultural field 106 is reached, some of the predefined number of electronically controllable sprayer nozzles 116 are activated automatically based on the predefined confidence threshold and the executed mapping of pixel data of crop plants and weeds from captured images. However, when the vehicle 104 takes its first turn and starts moving in a second direction (opposite direction) on the dotted path 612, then in such cases, a part of the boom arrangement 114 may cover some crop plants already sprayed previously by the system 102. In such situation, automatically spraying by the system 102 may cause the double spraying on such previously sprayed crop plants. Thus, the system 102 provides an option of manual deactivation of some electronically controlled sprayer nozzles, say of right unit, to override any automatic activation of manually deactivated electronically controlled sprayer nozzles when crop plants are detected and comes underneath such spray nozzles. Whereas remaining electronically controlled sprayer nozzles which are not manually deactivated continue to operate automatically to cover and spray chemical on other new crop pants while moving in that second direction.

FIGS. 7A and 7B collectively is a flowchart of a method for operating a system mounted in a vehicle for agricultural applications, in accordance with an embodiment of the present disclosure. FIGS. 7A and 7B are described in conjunction with elements from FIGS. 1A, 1B, 2, 3A, 3B, 3C, 4, 5, 6A and 6B. With reference to FIGS. 7A and 7B, there is shown a method 700 for operating the system 102 (of FIG. 1A) mounted for use in the vehicle 104 (of FIG. 1A) for agricultural applications. The method 700 includes operations 702 to 720. The method 700 is executed by the one or more hardware processors 202 of the system 102 (of FIG. 1A).

At 702, the method 700 comprises, acquiring, by the master control device 308, first geospatial location data including a first precision value from an inbuilt sensor of the master control device 308. The first geospatial location that includes the first precision value is used to determine the speed of the vehicle 104 (i.e., at what speed the vehicle 104 is moving).

At 704, the method 700 comprises, obtaining, by the master control device 308, location correction data from the external device 108 installed at a fixed location within a communication range of the master control device 308. In an example, the external device 108 is configured to continuously transmit the location correction data to the master control device 308, which is configured to calculate the precise and correct value of the first geospatial location. Moreover, the master control device 308 is configured to use the LoRa technology to receive the GPS data from a satellite and obtain the location correction data from the external device 108 to determine a highly precise GPS location for spray control.

At 706, the method 700 comprises, generating, by the master control device 308, second geospatial location data including a second precision value by applying the location correction data to the first geospatial location data, such as the second precision value is higher than the first precision value. The second geospatial location data that includes the second precision value are used to determine an improved odometry value (e.g., at centimetre level), which corresponds to a corrected distance value. Moreover, the second geospatial location is used to estimate current distance value (or position) relative to a starting location of the vehicle 104.

At 708, the method 700 comprises, communicating, by the master control device 308, the generated second geospatial location data to each slave control device of one or more slave apparatus 304. Moreover, the generated second geospatial location data received by each of the slave control device is used to determine the details related to distance moved by the vehicle 104.

At 710, the method 700 comprises, determining, by each slave control device, one or more time slots in advance to automatically perform a determined action when the vehicle is in motion based on a corresponding set of slave image-capture devices and the second geospatial location data received from the master control device 308. Moreover, each slave control device is communicatively coupled to the corresponding set of slave image-capture devices. Beneficially as compared to conventional approaches, each slave control device is configured to determine one or more time slots independently in advance to automatically perform a determined action without depending on rows and columns in the agricultural field 106. Each slave control device of the one or more slave apparatus may acquire a plurality of different sequence of images corresponding to different field-of-views (FOVs) from the corresponding set of slave image-capture devices.

At 712, the method 700 comprises determining, by the master control device 308, one or more time slots in advance to perform the determined action in advance based on the central image-capture device 306.

At 714, the method 700 comprises controlling, by the master control device 308 along with the slave control device of the one or more slave apparatus, a set of electronically controlled sprayer nozzles to direct a continuous release of a chemical specifically over one or more crop regions encompassing one or more crop plants for the determined time slot when the determined action is a perceptive spot spraying of the chemical.

At 716, the method 700 comprises comprising dynamically updating, by the master control device 308, the one or more crop regions encompassing the one or more crop plants based on a change in a front buffer and a rear buffer set for the central image-capture device 306.

At 718, the method 700 comprises dynamically updating, by each slave device of the one or more slave apparatus 304, the one or more crop regions encompassing the one or more crop plants based on a change in a front buffer and a rear buffer associated with each slave image-capture device of the corresponding set of slave image-capture devices.

At 720, the method 700 comprises controlling, by the master control device 308 along with the slave control device of the one or more slave apparatus 304, one or more pairs of weeding blades such that weeding blades of each pair of weeding blades are moved close to each other to uproot weeds between two crop plants and automatically moved apart from each other for the determined time slot ahead of a position of each crop plant in the agricultural field to bypass each crop plant as well as to uproot the weeds around each crop plant when the determined action is a perceptive weeds uprooting action.

The operations 702 to 720 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A system mounted in a vehicle for agricultural applications, comprising:

a master apparatus; and one or more slave apparatus, wherein the master apparatus comprises a central image-capture device and a master control device communicatively coupled to the central image-capture device, and wherein each slave apparatus comprises a set of slave image-capture devices and a slave control device communicatively coupled to corresponding set of slave image-capture devices, and wherein the master control device is configured to:

acquire first geospatial location data having a first precision value from an inbuilt sensor of the master control device;

obtain location correction data from an external device installed at a fixed location within a communication range of the master control device;

generate second geospatial location data having a second precision value by applying the location correction data to the first geospatial location data, wherein the second precision value is higher than the first precision value; and communicate the generated second geospatial location data to the slave control device; and wherein each slave control device is configured to determine one or more time slots in advance to automatically perform a determined action when the vehicle is in motion based on the corresponding set of slave image-capture devices and the second geospatial location data received from the master control device.

2. The system according to claim 1, wherein the master control device is further configured to determine the one or more time slots in advance to perform the determined action in advance based on the central image-capture device.

3. The system according to claim 1, wherein each slave control device of the one or more slave apparatus is further configured to acquire a plurality of different sequence of images corresponding to different field-of-views (FOVs) from the corresponding set of slave image-capture devices.

4. The system according to claim 1, wherein the master control device along with the slave control device of the one or more slave apparatus are configured to control a set of electronically controlled sprayer nozzles to direct a continuous release of a chemical specifically over one or more crop regions encompassing one or more crop plants for the one or more determined time slots when the determined action is a perceptive spot spraying of the chemical.

5. The system according to claim 4, wherein the master control device is configured to dynamically update the one or more crop regions encompassing the one or more crop plants based on a change in a front buffer and a rear buffer set for the central image-capture device.

6. The system according to claim 4, wherein each slave device of the one or more slave apparatus is configured to dynamically update the one or more crop regions encompassing the one or more crop plants based on a change in a front buffer and a rear buffer associated with each slave image-capture device of the corresponding set of slave image-capture devices.

7. The system according to claim 1, wherein the master control device along with the slave control device of the one or more slave apparatus are configured to control one or more pairs of weeding blades such that weeding blades of each pair of weeding blades are moved close to each other to uproot weeds between two crop plants and automatically moved apart from each other for the determined time slot ahead of a position of each crop plant in an agricultural field to bypass each crop plant as well as to uproot the weeds around each crop plant when the determined action is a perceptive weeds uprooting action.

8. The system according to claim 1, wherein the master control device comprises a first printed circuit board (PCB) that comprises a first microcontroller for a first level of processing that comprises booting different components of the first PCB, switching one of one or more buffer circuits associated with the central image-capture device, control a sequence of power supply to the different components of the PCB.

9. The system according to claim 8, wherein the first PCB of the master control device further comprises:

a camera connection port to connect to the central image-capture device;

a graphics processing unit, GPU, to process a sequence of images captured by the central image-capture device;

a power connector to receive a mains power supply from a battery of the vehicle; and a direct current, DC-to-DC converter to supply a filtered current to the different components of the first PCB from the mains power supply.

10. The system according to claim 8, wherein the first PCB of the master control device further comprises:

a wired local area network connector configured to connect to each slave device of the one or more slave apparatus;

a first antenna to obtain the location correction data from the external device via a low-power wireless wide area network (LPWAN); and a second antenna configured to establish a remote connectivity with a server via a cellular network.

11. The system according to claim 1, wherein the master control device further comprises a second PCB that comprises a first set of solenoid controls.

12. The system according to claim 1, wherein each slave control device of the one or more slave apparatus comprises a third PCB, wherein the third PCB comprises a second microcontroller for a first level of processing that comprises booting different components of the third PCB and switching one of one or more buffer circuits associated with each slave image-capture device of the corresponding set of slave image-capture devices.

13. The system according to claim 12, wherein the third PCB of each slave control device further comprises:

a plurality of camera connection ports to connect to the corresponding set of slave image-capture devices;

a graphics processing unit (GPU) configured to process a different sequence of images captured by each slave image-capture device of the corresponding set of slave image-capture devices;

a power connector to receive a power supply via the master control device; and a wired local area network connector configured to connect to the master control device.

14. A method for operating a system mounted in a vehicle, the method comprising:

acquiring, by a master control device, first geospatial location data having a first precision value from an inbuilt sensor of the master control device;

obtaining, by the master control device, location correction data from an external device installed at a fixed location within a communication range of the master control device;

generating, by the master control device, second geospatial location data having a second precision value by applying the location correction data to the first geospatial location data, wherein the second precision value is higher than the first precision value;

communicating, by the master control device, the generated second geospatial location data to each slave control device of one or more slave apparatus; and determining, by each slave control device, one or more time slots in advance to automatically perform a determined action when the vehicle is in motion based on a corresponding set of slave image-capture devices and the second geospatial location data received from the master control device, wherein each slave control device is communicatively coupled to the corresponding set of slave image-capture devices.

15. The method according to claim 14, further comprising determining, by the master control device, one or more time slots in advance to perform the determined action in advance based on the central image-capture device.

16. The method according to claim 14, further comprising acquiring, by each slave control device of the one or more slave apparatus, a plurality of different sequence of images corresponding to different field-of-views (FOVs) from the corresponding set of slave image-capture devices.

17. The method according to claim 14, further comprising controlling, by the master control device along with the slave control device of the one or more slave apparatus, a set of electronically controlled sprayer nozzles to direct a continuous release of a chemical specifically over one or more crop regions encompassing one or more crop plants for the determined time slot when the determined action is a perceptive spot spraying of the chemical.

18. The method according to claim 17, further comprising dynamically updating, by the master control device, the one or more crop regions encompassing the one or more crop plants based on a change in a front buffer and a rear buffer set for the central image-capture device.

19. The method according to claim 17, further comprising dynamically updating, by each slave device of the one or more slave apparatus, the one or more crop regions encompassing the one or more crop plants based on a change in a front buffer and a rear buffer associated with each slave image-capture device of the corresponding set of slave image-capture devices.

20. The method according to claim 14, further comprising controlling, by the master control device along with the slave control device of the one or more slave apparatus, one or more pairs of weeding blades such that weeding blades of each pair of weeding blades are moved close to each other to uproot weeds between two crop plants and automatically moved apart from each other for the determined time slot ahead of a position of each crop plant in an agricultural field to bypass each crop plant as well as to uproot the weeds around each crop plant when the determined action is a perceptive weeds uprooting action.

* * * * *